United States Patent
Held et al.

(10) Patent No.: US 10,523,912 B2
(45) Date of Patent: Dec. 31, 2019

(54) DISPLAYING MODIFIED STEREO VISUAL CONTENT

(71) Applicant: Microsoft Technology Licensing, LLC, Redmond, WA (US)

(72) Inventors: Robert Thomas Held, Seattle, WA (US); Matthew Calbraith Crisler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 24 days.

(21) Appl. No.: 15/886,780

(22) Filed: Feb. 1, 2018

(65) Prior Publication Data

US 2019/0238818 A1 Aug. 1, 2019

(51) Int. Cl.
*H04N 13/128* (2018.01)
*G06T 19/00* (2011.01)
*H04N 13/139* (2018.01)
*H04N 13/344* (2018.01)

(52) U.S. Cl.
CPC ......... *H04N 13/128* (2018.05); *G06T 19/006* (2013.01); *H04N 13/139* (2018.05); *H04N 13/344* (2018.05)

(58) Field of Classification Search
None
See application file for complete search history.

(56) References Cited

U.S. PATENT DOCUMENTS

| 9,094,657 B2 | 7/2015 | Oshikiri et al. |
| 9,225,969 B2 | 12/2015 | Aguirre-Valencia |
| 9,240,072 B2 | 1/2016 | Yamashita et al. |
| 9,288,470 B2 | 3/2016 | Yang et al. |

(Continued)

FOREIGN PATENT DOCUMENTS

| WO | 2016118344 A1 | 7/2016 |
| WO | 2016203654 A1 | 12/2016 |

OTHER PUBLICATIONS

Kikinis, et al., "Computer-assisted interactive three-dimensional planning for neurosurgical procedures", In Journal of Neurosurgery, vol. 38, Issue 4, Apr. 1, 1996, 10 Pages.

(Continued)

*Primary Examiner* — Michelle Chin
(74) *Attorney, Agent, or Firm* — Alleman Hall Creasman & Tuttle LLP

(57) ABSTRACT

Examples are disclosed that relate to devices and methods for displaying stereo visual content via a head-mounted display (HMD) device. In one example, a method comprises: establishing a default display distance from an origin in a virtual coordinate system; determining a modified display distance from the origin; determining that visual content comprises stereo visual content comprising a left eye image and a right eye image; based on determining that the visual content comprises stereo visual content, scaling the left eye image to a scaled left eye image and scaling the right eye image to a scaled right eye image using a scaling factor that is proportional to a difference between the modified display distance and the default display distance; and displaying the scaled left eye image and the scaled right eye image at the modified display distance.

20 Claims, 13 Drawing Sheets

(56) References Cited

U.S. PATENT DOCUMENTS

| | | | |
|---|---|---|---|
| 9,438,879 | B2 | 9/2016 | Newton et al. |
| 2004/0238732 | A1 | 12/2004 | State et al. |
| 2014/0225887 | A1* | 8/2014 | Aguirre-Valencia ..... G06T 3/40 345/419 |
| 2015/0254905 | A1 | 9/2015 | Ramsby et al. |
| 2015/0261003 | A1 | 9/2015 | Morifuji et al. |
| 2018/0152694 | A1 | 5/2018 | Oonishi |
| 2018/0176547 | A1* | 6/2018 | Kobayashi .............. G06F 3/012 |

OTHER PUBLICATIONS

Tanaka, et al., "Stereoscopic Scintigraphic Imaging of Breast Cancer Sentinel Lymph Nodes", In Journal of Breast Cancer, vol. 14, No. 1, Jan. 2007, pp. 92-99.

Zhou, et al., "Stereoscopic visualization and editing of automatic abdominal aortic aneurysms (AAA) measurements for stent graft planning", In Proceedings SPIE 6055, Stereoscopic Displays and Virtual Reality Systems XIII, Jan. 27, 2006, 11 Pages.

Kutka, Robert, "Reconstruction of correct 3d perception on screens viewed at different distances", In Journal of IEEE Transactions on Communications, vol. 42, Issue 1, Jan. 1994, pp. 29-33.

Lambooij, et al., "Visual discomfort and visual fatigue of stereoscopic displays: a review", In Journal of Imaging Science and Technology, vol. 53, No. 3, May 2009, 14 Pages.

Sun, et al., "Where is the sun?", In Journal of Nature Neuroscience, vol. 1, No. 3, Jul. 1998, pp. 183-184.

Sun, et al., "CT virtual endoscopy and 3D stereoscopic visualisation in the evaluation of coronary stenting", In Biomedical Imaging and Intervention Journal, vol. 5, Issue 4, Oct. 2009, 6 Pages.

Lipton, Lenny, "Foundations of the Stereoscopic Cinema: A Study in Depth", In Publication of Van Nostrand Reinhold, 1982, 325 Pages.

Lorensen, William E., "Marching through the visible man", In Proceedings of 6th Conference on Visualization, Oct. 29, 1995, pp. 368-373.

Love, et al., "High-speed switchable lens enables the development of a volumetric stereoscopic display", In Journal of Optics Express, vol. 17, Issue 18, Aug. 31, 2009, pp. 15716-15725.

Luursema, et al., "Optimizing conditions for computer-assisted anatomical learning", In Journal of Interacting with Computers, vol. 18, Issue 5, Sep. 2006, pp. 1123-1138.

Luursema, et al., "The role of stereopsis in virtual anatomical learning", In Journal of Interacting with Computers, vol. 20, Issues 4-5, Jan. 24, 1998, pp. 455-460.

Maidment, et al., "Effects of quantum noise and binocular summation on dose requirements in stereoradiography", In Journal of Medical Physics, vol. 30, Issue 12, Dec. 2003, pp. 3061-3071.

Sun, et al., "3D stereoscopic visualization of fenestrated stent grafts", In Journal of Cardiovascular and interventional Radiology, vol. 32, Issue 5, Jan. 9, 2009, pp. 1053-1058.

Masaoka, et al., "Spatial distortion prediction system for stereoscopic images", In Journal of Electronic Imaging, vol. 15, Issue 1, Jan. 2006, 13 Pages.

Matusik, et al., "3D TV: a scalable system for real-time acquisition, transmission, and autostereoscopic display of dynamic scenes", In Journal ACM Transactions on Graphics, vol. 23, Issue 3, Aug. 2004, pp. 814-824.

Maurer, et al., "Augmented reality visualization of brain structures with stereo and kinetic depth cues: system description and initial evaluation with head phantom", In Proceedings of the SPIE, vol. 4319, Feb. 17, 2001, pp. 445-456.

Strunk, et al., "A linearly-mapping stereoscopic visual interface for teleoperation", In Proceedings of the IEEE International Workshop of Intelligent Robots and Systems, Jul. 1990, pp. 429-436.

Stockman, et al., "Computer Vision", In Publication of Prentice Hall, Mar. 2000, 609 Pages.

Mountney, et al., "Three-dimensional tissue deformation recovery and tracking", In Journal of IEEE Signal Processing Magazine, vol. 27, Issue 4, Jul. 2010, pp. 14-24.

Serra, et al., "Interactive vessel tracing in volume data", In Proceedings of Symposium on Interactive 3D graphics, Apr. 27, 1997, pp. 131-137.

Nelson, et al., "Stereoscopic Evaluation of Fetal Bony Structures", In Journal of Ultrasound in Medicine, vol. 27, Issue 1, Jan. 2008, pp. 15-24.

Ng, et al., "Surgical planning for microsurgical excision of cerebral arterio-venous malformations using virtual reality technology", In Journal of Acta Neurochirurgica, May 2009, pp. 453-463.

Nicholson, et al., "Can virtual reality improve anatomy education? A randomised controlled study of a computer-generated three-dimensional anatomical ear model", In Journal of Medical Education, vol. 40, No. 11, Nov. 2006, pp. 1-19.

Rosenthal, et al., "Augmented reality guidance for needle biopsies: an initial randomized, controlled trial in phantoms", In Journal of Medical Image Analysis, vol. 6, Issue 3, Sep. 30, 2002, pp. 313-320.

Novotny, et al., "Stereo display of 3D ultrasound images for surgical robot guidance", In Proceedings of 28th Annual International Conference of IEEE Engineering in Medicine and Biology Society, Aug. 30, 2006, 4 Pages.

O'Shea, et al., "The assumed light direction for perceiving shape from shading", In Proceedings of 5th Symposium on Applied Perception in Graphics and Visualization, Aug. 9, 2008, pp. 135-142.

Rosahl, et al., "Virtual reality augmentation in skull base surgery", In Journal of Skull Base, vol. 16, Issue 2, Feb. 14, 2006, pp. 59-66.

Rogers, et al., "Vertical disparities, differential perspective, and binocular stereopsis", In Journal of Nature, vol. 361, Jan. 21, 1993, pp. 253-255.

Prystowsky, et al., "A virtual reality module for intravenous catheter placement", In American Journal of Surgery, vol. 177, Issue 2, Feb. 1999, pp. 171-175.

Pisano, et al., "Practice guideline for determinants of image quality in digital mammography", In Journal of American College of Radiology, 2007, pp. 493-516.

Held, et al., "A Guide to Stereoscopic 3D Displays in Medicine", In Journal of Academic Radiology, vol. 18, Issue 3, Aug. 2011, pp. 1035-1048.

"Oculus: Oculus Best Practices", https://static.oculus.com/documentation/pdfs/intro-vr/latest/bp.pdf, Retrieved Date: Jul. 10, 2017, pp. 1-36.

Abramoff, et al., "Automated segmentation of the optic disc from stereo color photographs using physiologically plausible features", In Journal of Investigative Ophthalmology & Visual Science, vol. 48, No. 4, Apr. 2007, pp. 1665-1673.

Ackerman, Michael J., "The visible human project", In Proceedings of IEEE, vol. 86, Issue 3, Mar. 1998, pp. 504-511.

Agrawala, et al., "The two-user Responsive Workbench: support for collaboration through individual views of a shared space", In Proceedings of the 24th annual conference on Computer graphics and interactive techniques, Aug. 3, 1997, 6 Pages.

Ahmed, et al., "The Sensitivity and Specificity of Nonmydriatic Digital Stereoscopic Retinal Imaging in Detecting Diabetic Retinopathy", In Journal of Diabetes Care, vol. 29, No. 10, Oct. 2006, pp. 2205-2209.

Backus, et al., "Horizontal and vertical disparity, eye position, and stereoscopic slant perception", In Journal of Vision Research, vol. 39, Issue 6, Mar. 1999, pp. 1143-1170.

Bajura, et al., "Merging virtual objects with the real world: seeing ultrasound imagery within the patient", In Journal of ACM Computer Graphics, vol. 26, Issue 2, Jul. 1992, pp. 203-210.

Balassy, et al., "Flat-panel display (LCD) versus high-resolution gray-scale display (CRT) for chest radiography: an Dbserver preference study", In American Journal of Roentgenology, vol. 184, Issue 3, Mar. 2005, pp. 752-756.

Banks, et al., "Perceiving slant about a horizontal axis from stereopsis", In Journal of Vision, vol. 1, Issue 2, Aug. 31, 2001, 41 Pages.

Zhai, et al., "The partial-occlusion effect: Utilizing semitransparency in 3D human-computer interaction", In Journal ACM Transactions on Computer-Human Interaction, vol. 3 Issue 3, Sep. 1996, pp. 254-284.

Yamanoue, et al., "Geometrical analysis of puppet theater and cardboard effects in stereoscopic HDTV images", In Journal of

(56) References Cited

OTHER PUBLICATIONS

IEEE Transactions on Circuits and Systems for Video Technology, vol. 16, Issue 6, Jun. 2006, pp. 744-752.

Blavier, et al., "Impact of 2D and 3D vision on performance of novice subjects using da Vinci robotic system", In Journal of Acta Chirurgica Belgica, vol. 106, Issue 6, Nov. 2006, pp. 662-664.

Blavier, et al., "Influence of 2D and 3D view on performance and time estimation in minimal invasive surgery", In Journal of Ergonomics, vol. 52, Issue 11, Oct. 21, 2009, pp. 1-8.

Burt, D. E. R., "Virtual reality in anaesthesia", In British Journal of Anaesthesia, vol. 75, Issue 4, Oct. 1995, pp. 472-480.

Woods, et al., "Image Distortions in Stereoscopic Video Systems", In Proceedings of SPIE vol. 1915, Stereoscopic Displays and Applications IV, Feb. 1993, pp. 1-13.

Chan, et al., "Effects of magnification and zooming on depth perception in digital stereomammography: an observer performance study", In Journal of Physics in Medicine and Biology, vol. 48, Issue 22, Nov. 4, 2003, pp. 3721-3734.

Chan, et al., "ROC study of the effect of stereoscopic imaging on assessment of breast lesions", In Journal of Medical Physics, vol. 32, Issue 4, Apr. 2005, pp. 1001-1009.

Cole, et al., "Directing gaze in 3D models with stylized focus", In Proceedings of 17th Eurographics conference on Rendering Techniques, Jun. 26, 2006, 12 Pages.

Wigmore, et al., "Virtual hepatic resection using three-dimensional reconstruction of helical computed tomography angioportograms", In Journal of Annals of surgery, vol. 233, Issue 2, Feb. 2001, pp. 221-226.

Deering, Michael, "High Resolution Virtual Reality", In Journal of ACM Computer Graphics, vol. 26, Issue 2, Jul. 1992, pp. 195-202.

Diner, Daniel B., "A new definition of orthostereopsis for 3d television", In Proceedings of IEEE International Conference on Systems, Man, and Cybernetics, Oct. 13, 1991, pp. 1053-1058.

Dipaola, et al., "Rembrandt's textural agency: A shared perspective in visual art and science", In Journal of Leonardo, vol. 43, Issue 2, Apr. 16, 2010, 14 Pages.

Duke, et al., "Vertical-disparity gradients are processed independently in different depth planes", In Journal of Vision Research, vol. 45, Issue 15, Jul. 2005, pp. 2025-2035.

Watt, et al., "Focus cues affect perceived depth", In Journal of Vision, vol. 5, Issue 10, Dec. 15, 2005, pp. 834-862.

Fishman, et al., "Surgical planning for liver resection", In Journal of Computer, vol. 29, Issue 1, Jan. 1996, pp. 64-72.

Fröhlich, et al., "Exploring geo-scientific data in virtual environments", In Proceedings of the Conference on Visualization, Oct. 24, 1999, pp. 169-173.

Fuchs, et al., "Augmented reality visualization for laparoscopic surgery", In Proceedings of the First International Conference on Medical Image Computing and Computer-Assisted Intervention, Oct. 11, 1998, 10 Pages.

Garding, et al., "Stereopsis, vertical disparity and relief transformations", In Journal of Vision Research, vol. 35, No. 5, Mar. 31, 1995, pp. 703-722.

Gering, et al., "An integrated visualization system for surgical planning and guidance using image fusion and interventional imaging", In Journal of Magnetic Resonance Imaging, vol. 13, Issue 6, Jun. 2001, pp. 967-975.

Getty, et al., "Clinical applications for stereoscopic 3-D displays", In Journal of Society for Information Display, vol. 15, Issue 6, Jun. 1, 2007, pp. 377-384.

Wartell, et al., "A geometric comparison of algorithms for fusion control in stereoscopic HTDs", In Journal of IEEE Transactions on Visualization and Computer Graphics vol. 8, Issue 2, Apr. 2002, pp. 129-143.

Goodsitt, et al., "Stereomammography: evaluation of depth perception using a virtual 3d cursor", In Journal of Medical Physics, vol. 27, Issue 6, Jun. 2000, pp. 1305-1310.

Vishwanath, et al., "Why pictures look right when viewed from the wrong place", In Journal of Nature neuroscience, vol. 8, No. 10, Sep. 18, 2005, pp. 1401-1410.

Held, et al., "Misperceptions in stereoscopic displays: a vision-science perspective", In Proceedings of the 5th symposium on Applied Perception in Graphics and Visualization, Aug. 9, 2008, pp. 23-32.

Held, et al., "Using blur to affect perceived distance and size", In Proceedings of ACM Transactions on Graphics, vol. 29, Issue 2, Mar. 1, 2010, pp. 1-33.

Hemminger, et al., "Assessment of real-time 3D visualization for cardiothoracic diagnostic evaluation and surgery planning", In Journal of digital Imaging, vol. 18, Issue 2, Jun. 2005, pp. 145-153.

Tuggy, Michael L., "Virtual reality flexible sigmoidoscopy simulator training: impact on resident performance", In Journal of the American Board of Family Practice, vol. 11, Issue 6, Nov. 1998, pp. 426-433.

Tevaearai, et al., "3-D vision improves performance in a pelvic trainer", In Journal of Endoscopy, vol. 32, Issue 5, Jun. 2000, pp. 464-468.

Hillaire, et al., "Depth-of-field blur effects for first-person navigation in virtual environments", In Proceedings of the 2007 ACM symposium on Virtual reality software and technology, Nov. 5, 2007, pp. 203-206.

Hillaire, et al., "Using an eye-tracking system to improve camera motions and depth-of-field blur effects in virtual environments", In Proceedings of IEEE Virtual Reality Conference, Mar. 8, 2008, pp. 47-50.

Hoffman, et al., "Vergence-accommodation conflicts hinder visual performance and cause visual fatigue", In Journal of Vision, vol. 8, No. 3, Mar. 28, 2008, pp. 1-30.

Terzić, et al., "Methods for reducing visual discomfort in stereoscopic 3D: A review", In Journal of Signal Processing: Image Communication, vol. 47, Sep. 2016, pp. 402-416.

Hu, et al., "Insertable stereoscopic 3D surgical imaging device with pan and tilt", In Proceedings of 2nd IEEE RAS & EMBS International Conference on Biomedical Robotics and Biomechatronics, Oct. 19, 2008, 6 Pages.

Hu, Yaoping, "The role of three-dimensional visualization in surgical planning of treating lung cancer", In Proceedings of 27th Annual International Conference of the Engineering in Medicine and Biology Society, Sep. 1, 2005, pp. 646-649.

Tendick, et al., "Development of virtual environments for training skills and reducing errors in laparoscopic surgery", In Proceedings of the SPIE International Symposium on Biological Optics, Jan. 24, 1998, 9 Pages.

Ilgner, et al., "Using a high-definition stereoscopic video system to teach microscopic surgery", In Proceedings of the SPIE Stereoscopic Displays and Virtual Reality Systems, vol. 6490, Feb. 2007, 7 Pages.

Johnson, et al., "Integrating pedagogical agents into virtual environments", In Journal of Presence: Teleoperators and Virtual Environments, vol. 7, Issue 6, Dec. 1998, pp. 1-38.

Jones, et al., "Controlling perceived depth in stereoscopic images", In Proceedings of the SPIE, vol. 4297: Stereoscopic Displays and Virtual Reality Systems VIII, Jun. 22, 2001, 8 Pages.

Jourdan, et al., "Stereoscopic vision provides a significant advantage for precision robotic laparoscopy", In British Journal of surgery, vol. 91, Issue 7, Jul. 2004, pp. 879-885.

Tendick, et al., "A virtual environment testbed for training laparoscopic surgical skills", In Journal of Presence, vol. 9, Issue 3, Jun. 2000, 33 Pages.

"International Search Report and Written Opinion Issued in PCT Application No. PCT/US19/015041", dated Jul. 1, 2019, 13 Pages.

\* cited by examiner

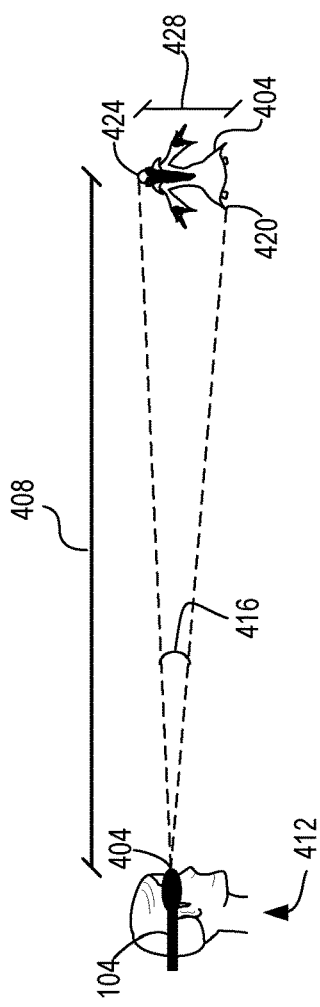
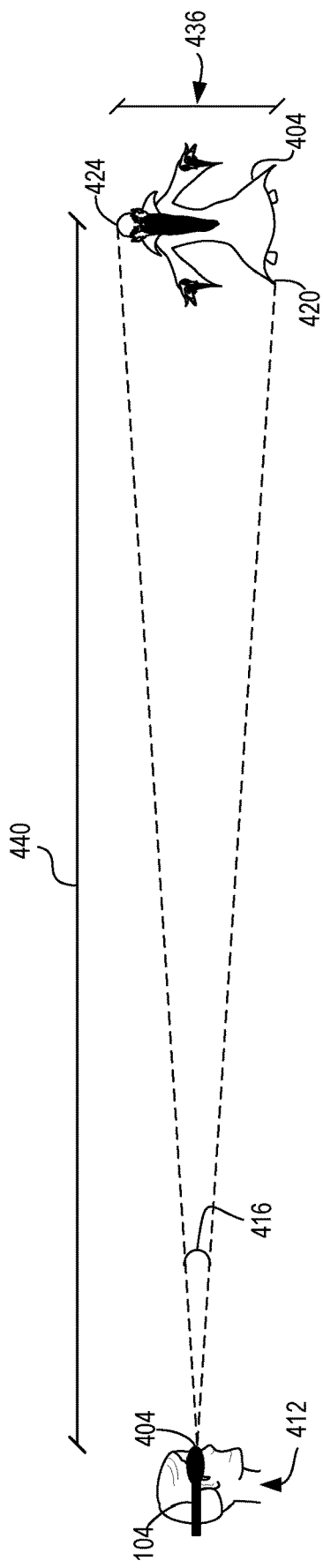
FIG. 4A
FIG. 4B

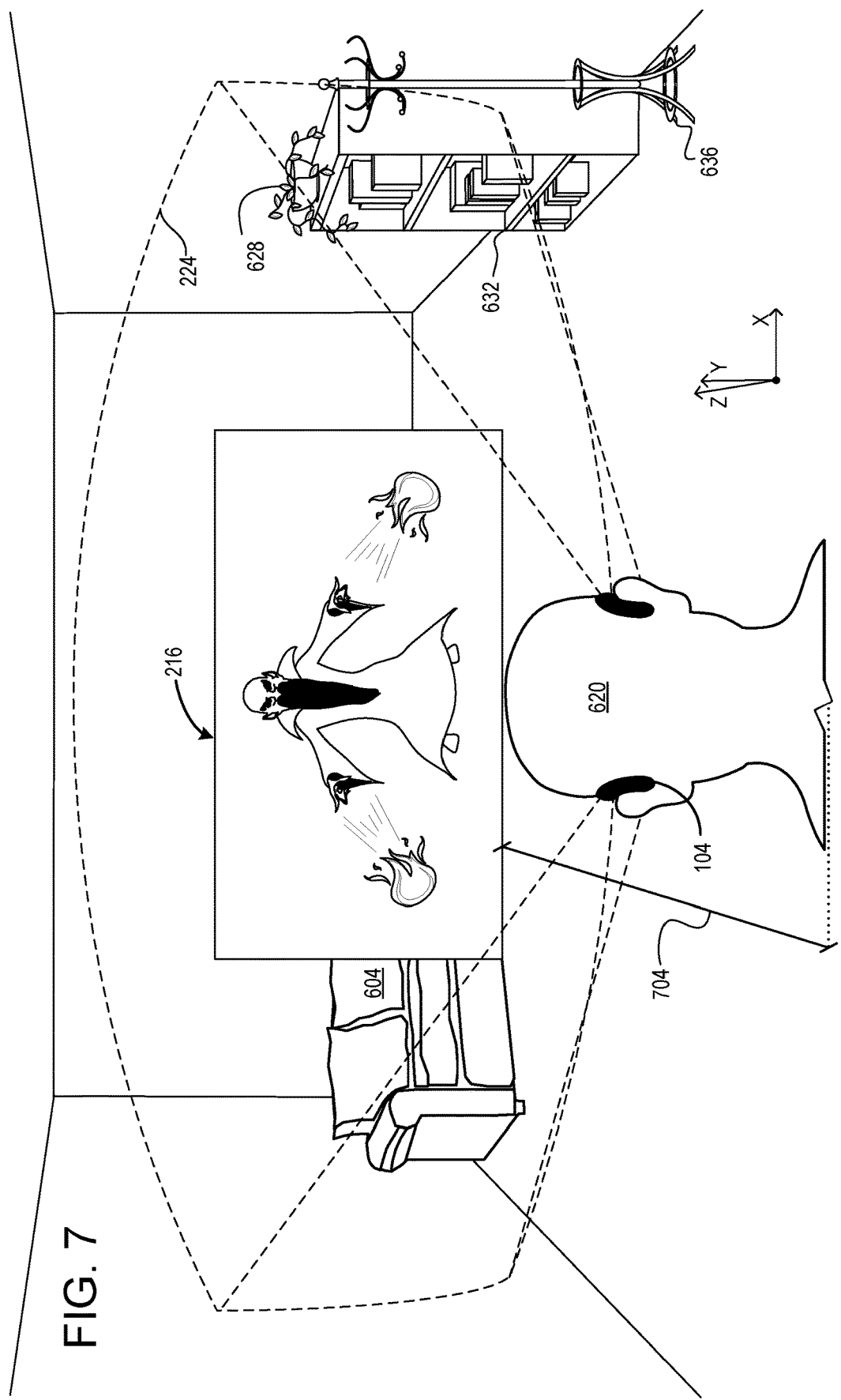

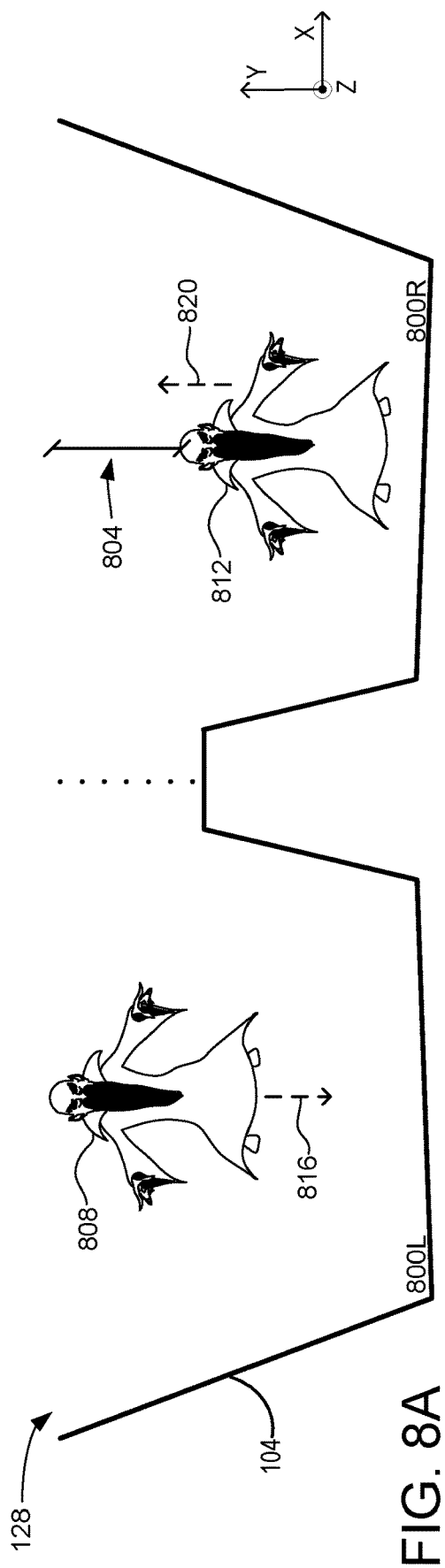
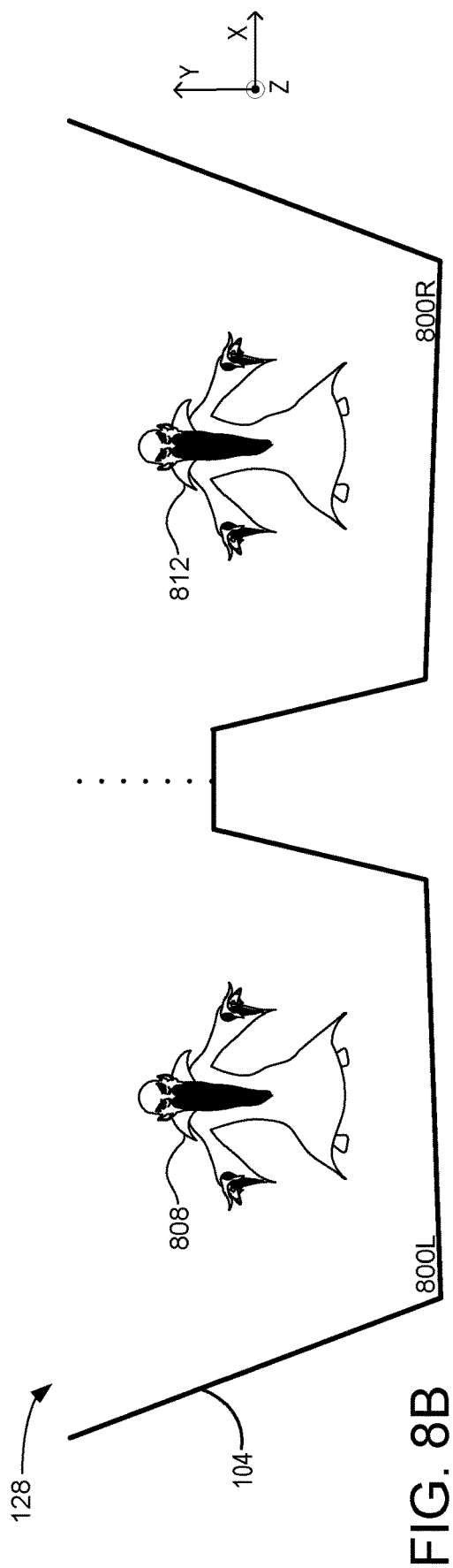
FIG. 8A
FIG. 8B

DISPLAYING MODIFIED STEREO VISUAL CONTENT

BACKGROUND

Stereoscopic displays can introduce distortions and/or spatial misperceptions of displayed content based on viewer movement. A head-mounted display device also may display stereoscopic content originally produced for traditional fixed-position displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to devices and methods for displaying visual content via a head-mounted display (HMD) device. In one example, a method comprises: establishing a default display distance from an origin in a virtual coordinate system, setting a modified display distance from the origin, determining that the visual content comprises stereo visual content comprising a left eye image and a right eye image, based on determining that the visual content comprises stereo visual content, scaling the left eye image to a scaled left eye image and scaling the right eye image to a scaled right eye image using a scaling factor that is proportional to a difference between the modified display distance and the default display distance, and displaying the scaled left eye image and the scaled right eye image at the modified display distance.

BRIEF DESCRIPTION OF THE DRAWINGS

FIGS. 4A and 4B show an illustrative example of scaling and displaying stereo visual content at a modified display distance according to examples of the present disclosure.

FIG. 7 shows an example of shortening the modified display distance to a shortened modified display distance according to examples of the present disclosure.

FIGS. 8A and 8B show illustrative examples of changing a displayed position of a right eye image and/or left eye image according to examples of the present disclosure.

DETAILED DESCRIPTION

Head-mounted display (HMD) devices may display visual content to a user via a virtual reality experience or an augmented reality experience. For purposes of the present disclosure, an HMD device provides a virtual reality experience by displaying visual content via an opaque, non-see-through display that creates a fully virtual environment. For purposes of the present disclosure, an HMD device provides an augmented reality experience by displaying visual content via an at least partially see-through display that also enables the user to view her real-world surroundings.

In some examples, virtual or augmented reality HMD devices also may be used to view stereoscopic (stereo) content, such as three-dimensional (3D) movies. Traditionally, stereo content comprises a left eye image and a right eye image displayed as a stereo pair to provide visual depth cues to a viewer of the stereo content. Such stereo content is typically captured using one or more cameras and is displayed and viewed on a fixed-position display, such as a 2D television, 3D television or projection screen.

Traditional fixed-position stereoscopic displays may not display stereoscopic content optimally when the user moves his or her head or otherwise changes position. For example, such user movement may result in stereo visual content displayed at a suboptimal location, which can produce spatial misperceptions, visual artifacts and/or other distortions. For example, shifting and shearing of the displayed image(s) may occur due to motion of the user's head while viewing stereo visual content via a fixed-position display device, such as a 3D television.

As described in more detail below, the systems and methods of the present disclosure enable HMD devices to modify and display stereoscopic visual content in a manner that minimizes visual artifacts and other distortions created by previous solutions.

Figure 1:
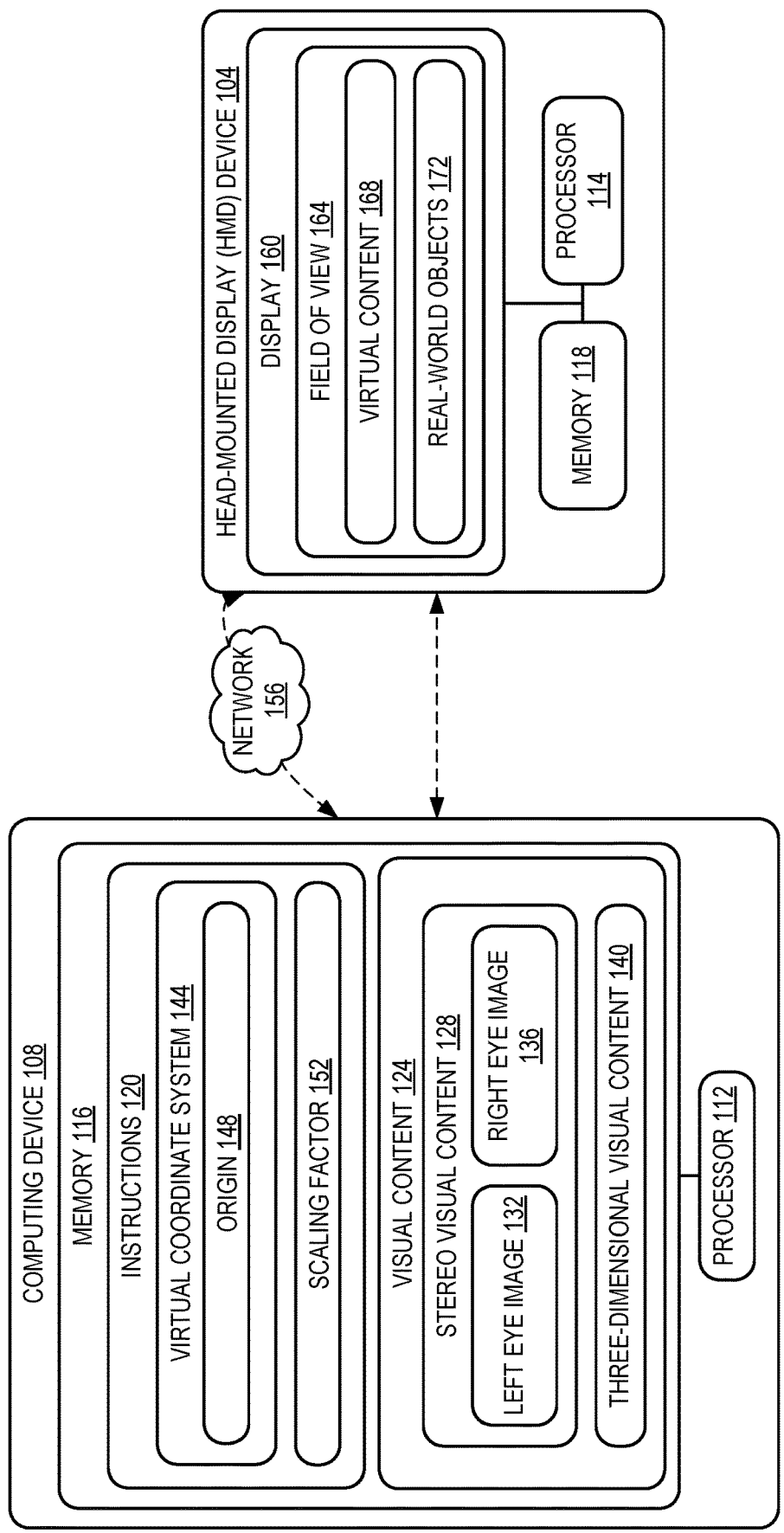
FIG. 1 shows a block diagram illustrating an example system for displaying visual content via an HMD device according to examples of the present disclosure.

FIG. 1 illustrates an example of a computing device 108 communicatively coupled to an HMD device 104 according to examples of the present disclosure. In this example, the computing device 108 is shown as a separate component from the HMD device 104. The HMD device 104 may be communicatively coupled to the computing device 108 via a wired or wireless connection. In some examples, the HMD device 104 may be communicatively coupled to the computing device 108 via a network 156. The network 156 may take the form of a local area network (LAN), wide area network (WAN), wired network, wireless network, personal area network, or a combination thereof, and may include the Internet. In other examples, the computing device 108 may be integrated into the HMD device 104.

The computing device 108 comprises memory 116 holding instructions 120 executable by a processor 112 to perform one or more of the methods and processes described herein. Additional details regarding the components and computing aspects of the computing device 108 are described in more detail below with reference to FIG. 11.

The instructions 120 may be executed to generate a virtual coordinate system 144 including an origin 148 by which visual content 124 may be displayed to appear in a fully virtual or augmented reality environment. As described above, the visual content 124 may comprise stereo visual content 128, comprising a left eye image 132 and a right eye image 136. As described in more detail below, the instructions 120 also may comprise one or more scaling factors 152 that may be used to scale visual content 124.

Each frame of stereo visual content 128 may include a single left eye image 132 and a single right eye image 136 to be displayed for the user's left eye and right eye, respectively. In some examples, the left eye image 132 and right eye image 136 may be interlaced. In one example, three-dimensional movies may be filmed using stereoscopic cameras that provide the perspective of a single camera view for each eye.

In other examples, the visual content 124 may comprise three-dimensional visual content 140. Three-dimensional visual content 140 may comprise data describing a captured object or scene from a plurality of perspectives. In some examples, three-dimensional visual content 140 may comprise a photographic recording of a light field that may be displayed via an HMD device to depict a more complete three-dimensional representation of the captured subject than available with a single stereoscopic image or video pair. Examples of three-dimensional visual content 140 include holograms.

In some examples, viewing three-dimensional visual content 140 from a plurality of perspectives may be facilitated by generating image data for the three-dimensional visual content using position and/or orientation data provided by computing device 108 or HMD device 104. The position and/or orientation data may be used, for example, to display the three-dimensional visual content 140 with a realistic and stable position and orientation.

Generally when viewing stereo visual content 128, a viewer is limited to viewing the content at the perspective with which the content was captured or created. In these situations and as noted above, spatial misperceptions, visual artifacts and/or other distortions created by user movement can make it difficult to maintain realism, stability and orientation of the stereo visual content 128. Accordingly, and as described in more detail below, the systems and methods of the present disclosure may enable HMD devices to display stereo visual content in a manner that reduces such distortions, enhances realism and provides a more enjoyable viewing experience.

With continued reference to FIG. 1, the HMD device 104 may comprise a display 160, a processor 114 and memory 118. In some examples, display 160 may be an opaque and non-see through display that provides a virtual reality experience to the user. For example, an HMD device 104 that provides a virtual reality experience displays a field of view 164 that solely includes virtual content 168. In some examples, images of real-world objects 172 from the user's real-world environment may be captured and used to display corresponding virtual objects within the virtual environment.

In some examples, the display 160 may comprise an at least partially transparent display that presents an augmented reality experience comprising a partially virtual three-dimensional environment in which the user views her real-world environment along with virtual content displayed to appear within the environment. In some examples, display 160 may provide both virtual reality and augmented reality functionality. Examples of HMD devices 104 that may display fully virtual and partially virtual three-dimensional environments are described in more detail below with respect to FIG. 9.

In some examples, HMD device 104 may display stereo visual content 128 by displaying a stereo pair of a left eye image 132 and a right eye image 136 to provide stereoscopic depth cues to a user of the HMD device 104. In some of the examples illustrated herein, for simplicity, a single image is illustrated to depict stereo visual content 128 and three-dimensional visual content 140.

Figure 2:
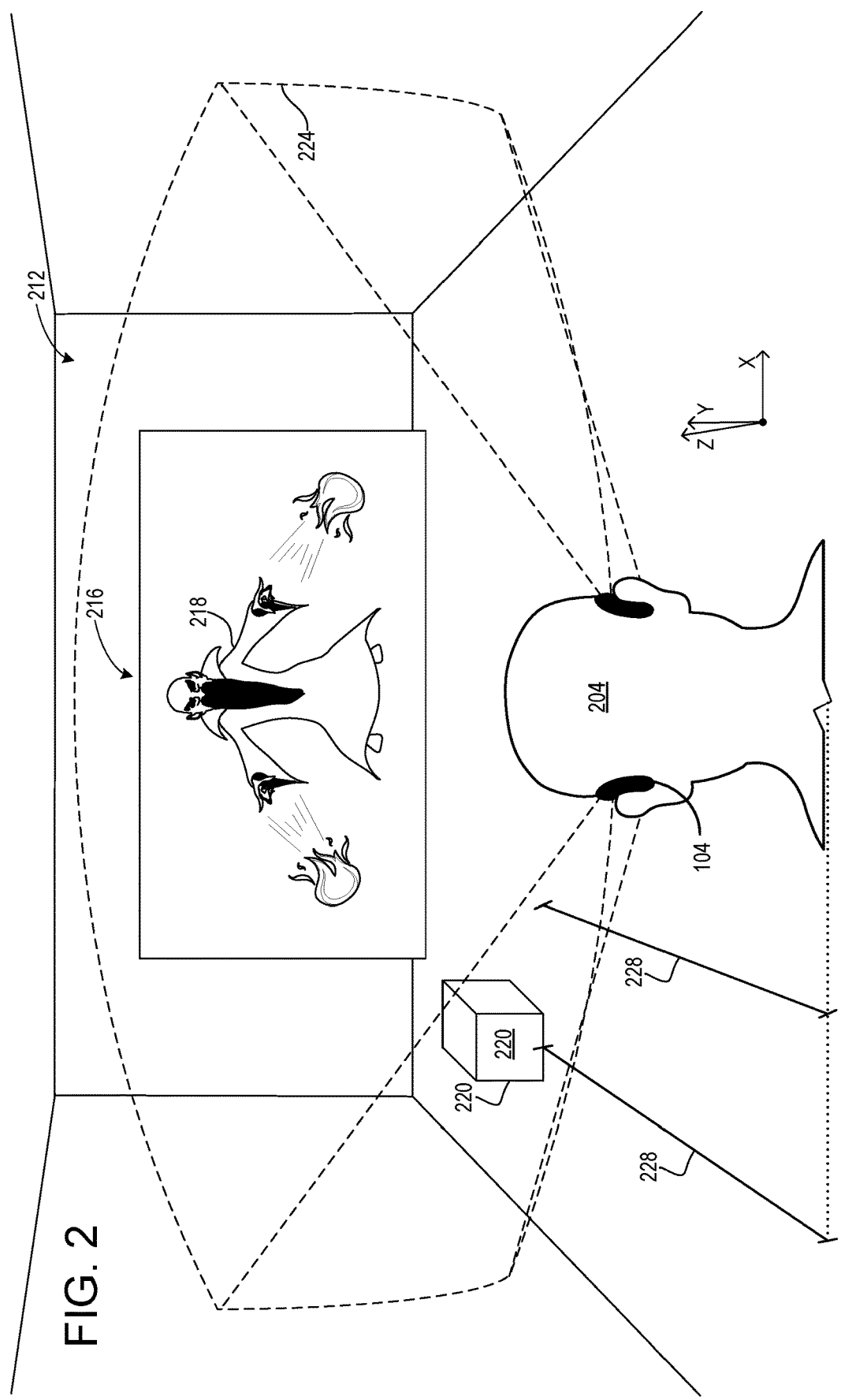
FIG. 2 is an illustrative example of a use case scenario in which a user views stereo visual content and three-dimensional content at a default display distance according to examples of the present disclosure.
Figure 3A:
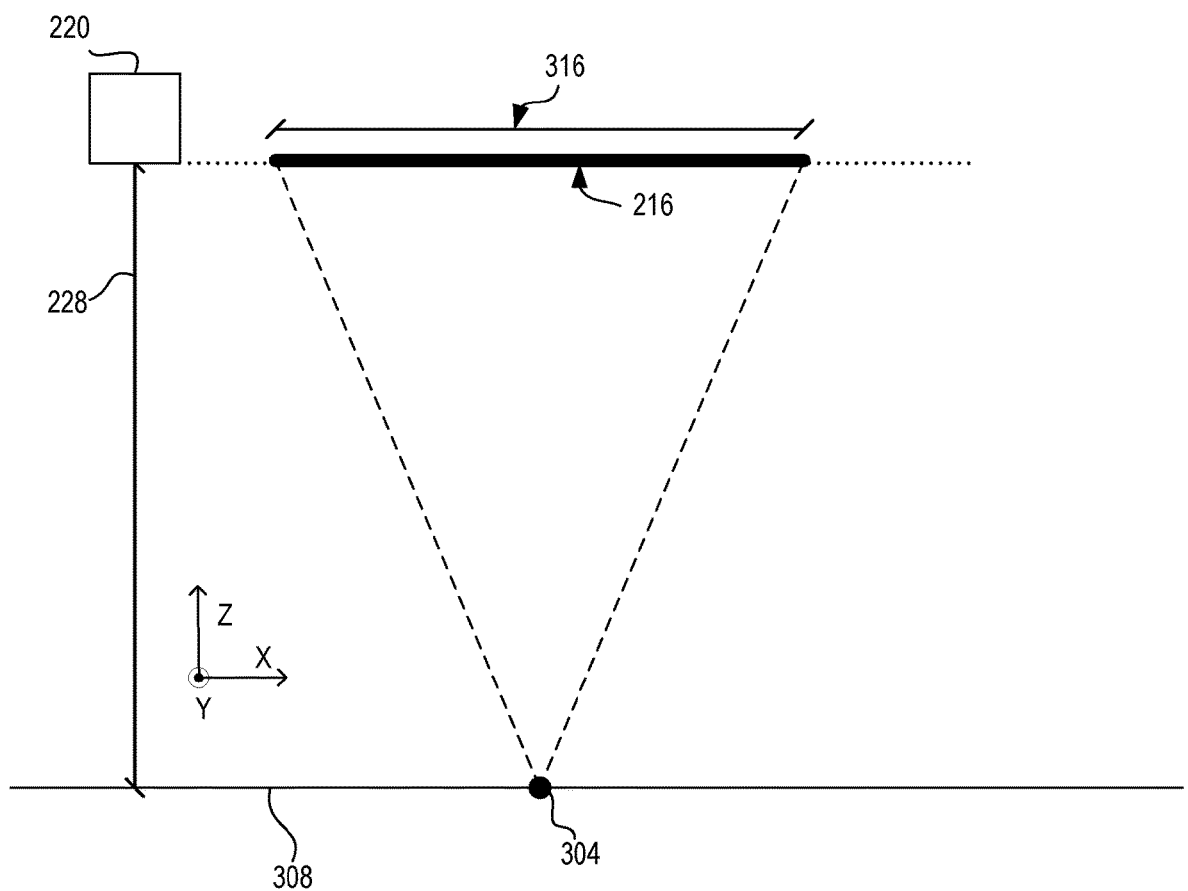
FIG. 3A shows a simplified top-down view of the room of FIG. 2.

With reference now to the example of FIGS. 2 and 3A, a user 204 may view visual content displayed via an HMD device 104 at a variety of locations within a room 212. In this example, the HMD device 104 displays stereo visual content 128 in the form of a 3D movie 216 including an evil wizard 218. The HMD device 104 also may display separate three-dimensional visual content 140 in the form of a holographic cube 220. The HMD device 104 displaying the visual content in this example is an augmented-reality HMD device with a field of view 224.

As described above, three-dimensional visual content 140 differs from stereo visual content 128 for at least the reason that three-dimensional visual content may be displayed and viewed from a plurality of perspectives, with different perspectives revealing new visual information that is unavailable from other perspectives. On the other hand, each image in stereo visual content 128 is captured from a single perspective of the capture device, thereby limiting the user to viewing such images from that perspective.

As illustrated in FIGS. 2 and 3A, in one example both the three-dimensional cube 220 and the stereoscopic 3D movie 216 may be displayed at a default display distance 228 relative to the HMD device 104. In this example, the left and right images of the stereoscopic 3D movie 216 are displayed floating in the room 216 at a position coplanar with a front face 232 of the cube 220. The default display distance 228 may be a fixed distance that is established to provide the user 204 with a comfortable viewing experience in which the displayed visual content is neither too close nor too far away from the viewer. FIG. 3A illustrates a simplified top down view of the room 212 of FIG. 2, in which the HMD device 104 is located at a viewing position 304 that corresponds to an origin in a three-dimensional virtual coordinate system, indicated by the X-Y-Z axes.

In the example of FIGS. 2 and 3A, displaying visual content via the HMD device 104 comprises establishing the default display distance 228 relative to the origin/viewing position 304 in the virtual coordinate system. As shown in FIG. 3A, the default display distance 228 is illustrated extending in the Z-axis direction perpendicularly from an X-Y plane 308 extending through the origin/viewing position 304. In other examples a default display distance may be established and defined in any other suitable manner.

In the example of FIGS. 2 and 3A, both the stereoscopic 3D movie 216 and the cube 220 are displayed at the default display distance 228. In some examples, the default display distance 228 may be between approximately 1.25 meters and approximately 5 meters from the origin/viewing position 304. In some examples, the default display distance 228 may be approximately 2 meters from the origin/viewing position 304.

With reference again to the FIGS. 2 and 3A, in some examples the cube 220 and/or stereoscopic 3D movie 216 may be displayed in a world-locked manner. When displayed in a world-locked manner, visual content appears to be fixed relative to real world objects and/or other displayed virtual objects viewable through the HMD device 104. In this manner, a wearer of the HMD device may move around a real world physical environment while perceiving the world-locked visual content as remaining stationary in a fixed location and orientation in the physical environment. In the example of FIGS. 2 and 3A, this may allow the cube 220 to be displayed and viewed from a plurality of perspectives, with different perspectives revealing new visual information that is unavailable from other perspectives. The HMD 104 may accomplish this using a variety of techniques, including head and position tracking as described in more detail below.

In other examples, the HMD device 104 may operate in a body-lock display mode in which one or more virtual objects may be displayed via the HMD device with body-locked positions. When displayed in a body-locked manner, a virtual object appears to be fixed relative to the wearer of the HMD device 104, and the body-locked position of the virtual object appears to be moveable relative to real-world objects and other virtual objects.

As noted above, when a user is viewing stereo visual content via an HMD device, user head movement can cause visible distortions in the displayed content, such as unnatural shifting and shearing of the image(s). Such distortions may be particularly prominent when the stereo visual content is displayed in a world-locked manner. The amount of image shifting and shearing perceived by a user may depend at least in part on the distance from the user's head to the displayed image(s). In general, as the distance from the user's head to the displayed image decreases, image shifting/shearing caused by user head movement increases. For example, stereo visual content displayed and viewed on a desktop computer monitor is more susceptible to shifting and shearing caused by user head movement as compared to stereo visual content displayed in a movie theater, where the content is displayed at a relatively large distance from the user.

Accordingly, and in one potential advantage of the present disclosure, a modified display distance that is greater than the default distance may be set, and stereo visual content may be scaled and displayed via an HMD device at the modified display distance. In this manner, image distortions at the default display distance may be minimized or substantially eliminated. Additionally, and as described in more detail below, by scaling the stereo visual content by a scaling factor proportional to a difference between the modified display distance and the default display distance, the content displayed at the modified display distance may be perceived by the user as being substantially the same size as if displayed at the default display distance. This treatment maintains the angular size of the visual content, so that a viewer who remains still and views one of the stereoscopic images with one eye is not able to discern between original content displayed at the default display distance and scaled content displayed at the modified display distance. The only perceptible difference may arise when the viewer moves his or her head and notes a difference in the degree of a shearing artifact.

Figure 3B:
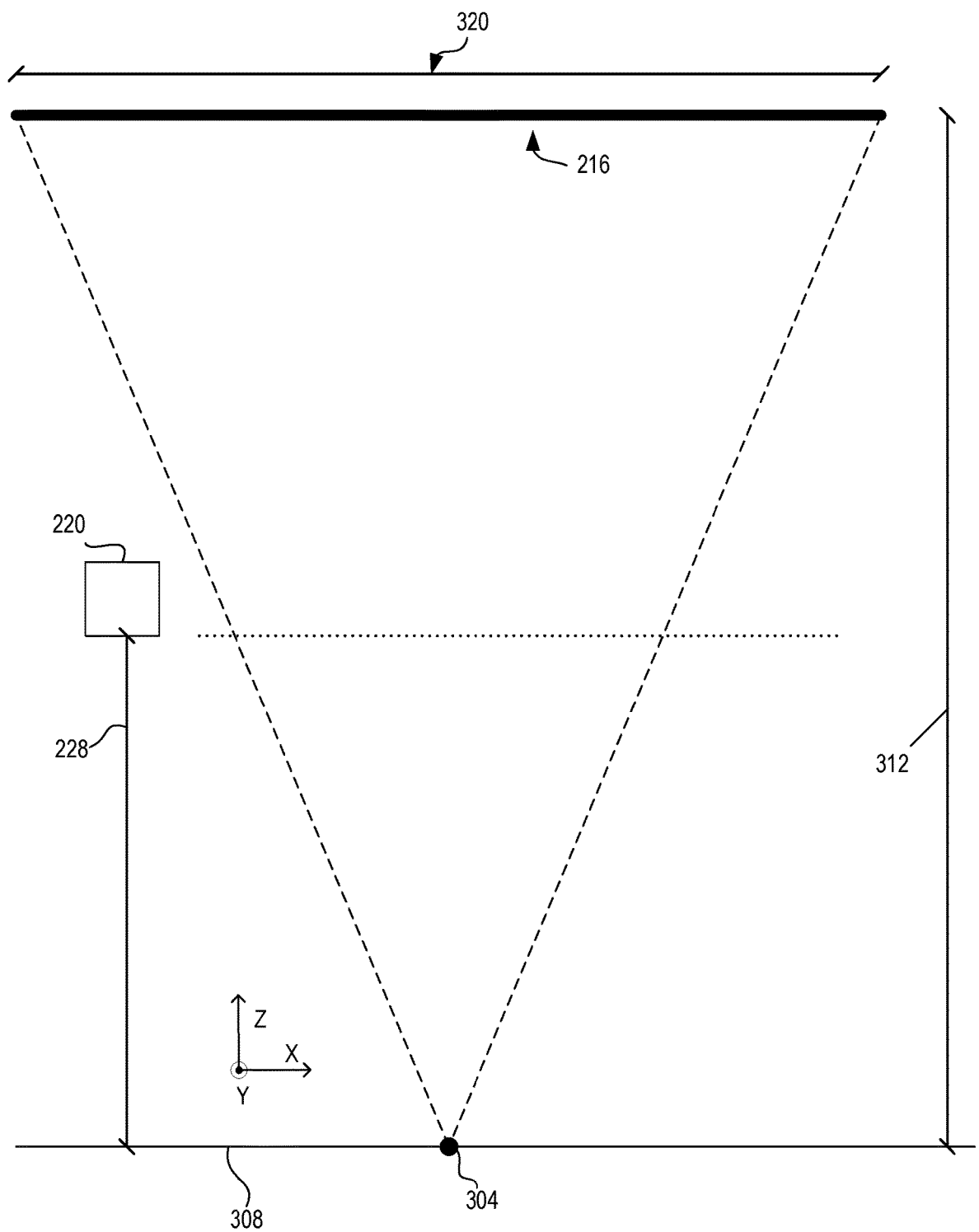
FIG. 3B shows a simplified top-down view of the room of FIG. 2 in which the stereo visual content is displayed at a modified display distance.

With reference now to FIG. 3B, an example of displaying stereo visual content at a modified display distance 312 is illustrated. In this example, the system may determine that the visual content of the 3D movie 216 comprises stereo visual content including left eye images and right eye images. Based on determining that the 3D movie 216 comprises stereo visual content, the movie may be displayed at the modified display distance 312.

The modified display distance 312 may be any suitable distance greater than the default display distance 228. In different examples, the modified display distance 312 may be approximately 5 meters, 10 meters, 20 meters, 30 meters, or other suitable distance. While greater modified display distances may be desirable, in some examples approximately 10 meters may be a suitable display distance for common types of stereo visual content 128. In some examples, different modified display distances may be determined and set based on one or more aspects related to the stereo visual content, including but not limited to image content and image quality. Additionally or alternatively, different modified display distances may be determined and set based on one or more aspects related to the physical space in which the HMD 104 is located, including but not limited to dimensions, geometric characteristics, locations of real world objects, and surface textures.

As noted above, stereo visual content may comprise a left eye image and a corresponding right eye image. For stereo visual content in the form of a video or movie, each frame of the content may comprise a left eye image and corresponding right eye image. Accordingly and in another aspect of the present disclosure, in addition to displaying the visual content at a modified display distance, each left eye image and right eye image of each frame may be scaled to a scaled left eye image and scaled right eye image, respectively, using a scaling factor 152 that is proportional to a difference between the modified display distance and the default display distance. In this manner, the apparent size of the stereo visual content at the default display distance may be preserved when the scaled stereo visual content is displayed at the modified display distance.

In some examples, the left eye image 132 and the right eye image 136 may be scaled by the same scaling factor 152. In other examples, the left eye image 132 and the right eye image 136 may be treated independently, and each image may be scaled by a different scaling factor 152.

In the example illustrated by FIG. 3B, the scaling factor 152 may be proportional to a difference between the modified display distance 312 and the default display distance 228. In one example, the default display distance may be 2 m. and the modified display distance may be 4 m., such that the modified display distance is twice the default display distance. Accordingly, in this example the scaling factor is 2.

With respect to the example shown in FIG. 3A, each frame of the movie 216 may have a default width 316 when displayed at the default display distance 228. In the present example it follows that, when displayed at the modified display distance 312, each frame is scaled by the scaling factor 2 to have a modified width 320 that is twice the default width 316, as schematically illustrated in FIG. 3B. In other examples, other default display distances, modified display differences and corresponding scaling factors may be utilized. Additionally, it will be understood that width is one example of a dimension of the stereo visual content 128 that may be scaled to provide a more comfortable user experience. In the present example, each left and right image of each frame of the movie 216 is rectangular, thus the height of each frame at the default display distance 228 also is multiplied by the same scaling factor to preserve the aspect ratio of the movie at the modified display distance 312. In another example, the diameter of circular stereo visual content 128 may be scaled.

With reference now to the examples shown in FIGS. 4A and 4B and as noted above, by scaling stereo visual content in this manner, the apparent size of the content at a default display distance 408 may be preserved when displayed at a modified display distance 440. For illustrative purposes the following description refers to a left eye image 404 of one frame of stereo visual content. It will be appreciated that this description applies equally to the corresponding right eye image of the frame.

In the example illustrated in FIGS. 4A and 4B, the left eye image 404 may be displayed at the default display distance 408 from an origin/viewing position 404 in a virtual coordinate system as described above. An angular size 416 of the left eye image 404 is an angular measurement of the size of image 404 as projected on the viewer's retina. In anatomical terms, the angular size 416 may represent the angle that the eyes of the viewer 412 rotate through between looking directly at a bottom portion 420 of the left eye image 404 to looking at a top portion 424. In the example illustrated in FIG. 4A, the distance between the bottom 420 of the left eye image 404 to the top 424 is represented by unscaled height 428. Also and for ease of description, the left eye image 404 is depicted in FIG. 4A as it would be seen from the perspective of the viewer 412.

FIG. 4B illustrates one example of the left eye image 404 scaled and displayed at a modified display distance 440 from the origin/viewing position 404. In the example illustrated by FIG. 4B, the scaled left eye image 404 has a scaled height 436 that is the product of unscaled height 428 multiplied by a scale factor as discussed above. In this example, the modified display distance 440 is twice the default display distance 408. Accordingly, the scale factor is the modified display distance 440 divided by the default display distance 408, yielding a value of 2. It follows that the scaled height 436 is twice the unscaled height 428.

By scaling and displaying the left eye image 404 in this manner, the HMD device 104 enables the viewer 412 to perceive the scaled left eye image 404 at modified display distance 440 as having the same apparent size as the unscaled left eye image 404 at the default display distance 408. Additionally and as described above, utilizing the modified display distance 440 reduces or substantially eliminates certain image distortions in stereo visual content, thereby providing the viewer 412 with a more pleasant, engrossing and less distracting viewing experience.

In some examples, the relationship between the dimensions of an item of visual content, its display distance and the apparent size of the visual content may be described by the following formula, where θ represents an angular size of the visual content, x represents a dimension of the visual content, and D represents the display distance:

$$\theta = 2\tan^{-1}\frac{x}{2D}$$

With reference to the examples shown in FIGS. 4A and 4B, this formula describes a relationship in which the angular size 416 of the visual content depends on the fraction $$\frac{x}{2D},$$

which represents a dimension of the visual content divided by twice the display distance. As a result, the angular or apparent size 416 of the stereo visual content 404 and the scaled stereo visual content 432 may remain the same to the viewer 412 as the display distance is modified and the dimensions of the content correspondingly scaled. In other examples, the dimensions of the content may be scaled using any other suitable approach, and may utilize proportions slightly varying from 1:1.

Figure 5:
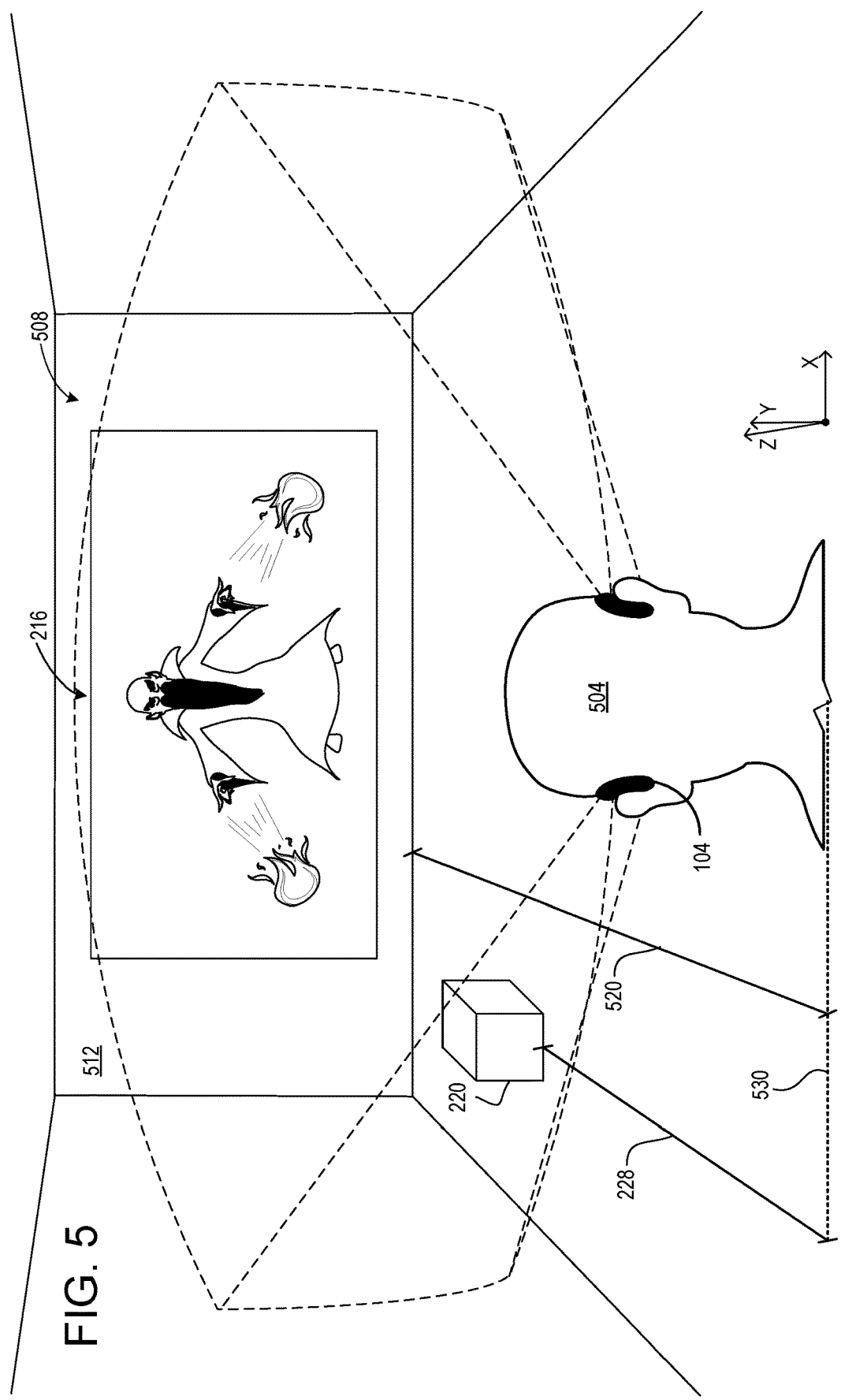
FIG. 5 shows an example of setting the modified display distance to a distance from the origin to a planar surface according to examples of the present disclosure.

In some examples, a modified display distance may be set based on one or more physical aspects of the real-world environment of a user. FIG. 5 illustrates one example of setting the modified display distance to accommodate the real-world environment of a viewer 504. The viewer 504 is in a room 508 comprising a planar surface in the form of a wall 512 that is approximately 5 m. from the viewer. In some examples, utilizing a modified display distance larger than 5 m. may be desirable for greater reductions of spatial misperceptions such as shearing. However, displaying stereo visual content 216 at a virtual location that is "behind" the wall 512 in the virtual coordinate system may interfere with the perception of viewer 504 in other ways. Accordingly, in this example the system may identify the wall 512 as a planar surface in the viewer's real-world environment. Based on this identification, a modified display distance 520 may be set to the distance from the origin in the virtual coordinate system to the wall 512. In this example, the origin may be a point (not shown) on the HMD device 104, and the dimensional line indicating modified display distance 520 extends from the Z-axis coordinate of the wall 512 to the Z-axis coordinate of the origin (indicated by line 530).

Any suitable method may be used to identify planar surfaces. In one example, surface reconstruction based on captured images of the room 508 may be used to identify planar surfaces and to determine how far the wall 512 is from the HMD device 104 and origin, thus setting the modified display distance 520.

In some examples, surface reconstruction or any other suitable method also may be used to determine an amount of texture on a planar surface, such as one or more of contrast, brightness or other characteristics of the surface. Such characteristics may be compared to one or more threshold amounts to determine a modified display distance. In some examples, heavily textured surfaces may be less desirable as locations at which stereo visual content is displayed. Accordingly, a threshold amount of surface texture may be established and utilized to set a modified display distance. For example, if the wall 512 is determined to have an amount of texture greater than a threshold amount, the modified display distance may be set to a distance between the wall and the origin.

With reference again to FIG. 5 and as noted above, the default display distance 228 may be utilized to display three-dimensional visual content. Accordingly and in some examples, the computing device 108 may determine that selected visual content comprises three-dimensional visual content. Based on determining that the selected visual content comprises three-dimensional visual content, the three-dimensional visual content may be displayed at the default display distance. In the example of FIG. 5, based on determining that the holographic cube 220 comprises three-dimensional visual content, the cube is displayed via the HMD 504 at the default display distance 228.

Figure 6:
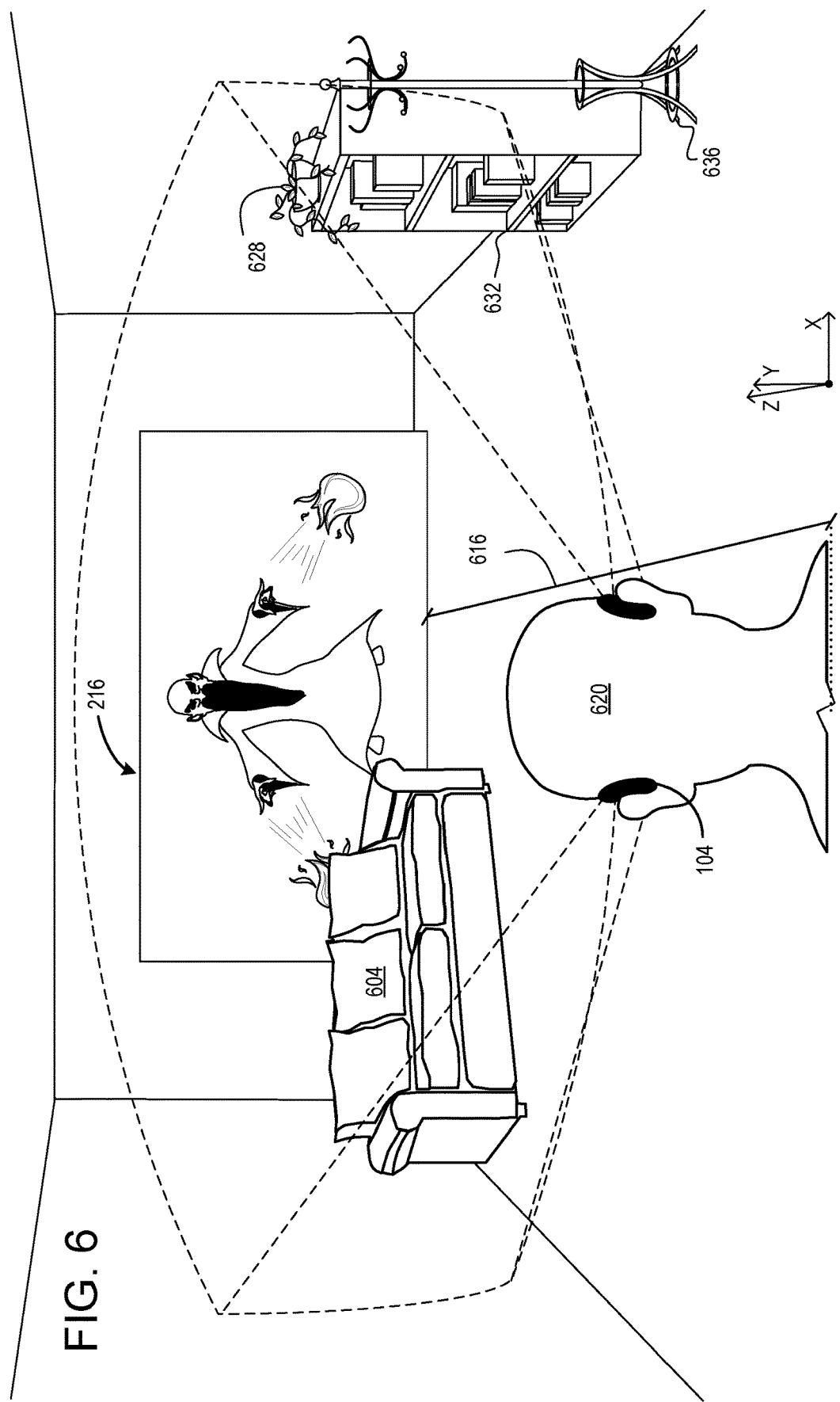
FIG. 6 shows an example of an occluding object between a location of the HMD device and a location of the visual content at the modified display distance according to examples of the present disclosure.

In some examples, a suitable display distance for visual content also may be impacted by real-world objects 172 and/or virtual content 168 within a real-world or virtual environment. FIG. 6 illustrates one example of an occluding object in the form of real-world couch 604 that may interfere with the display of stereo visual content at a location behind the couch. In this example, the couch 604 is located between the HMD device 104 and the location of stereo visual content 216 at a modified display distance 616.

Like the disadvantages of displaying stereo visual content at a virtual location "behind" the wall 512 of FIG. 5, displaying the stereo visual content 216 "behind" the couch 604 in FIG. 6 may interfere with the perception of the content by the viewer 620. Accordingly, and in one potential advantage of the present disclosure, the system may determine that the couch 604 is located between a location of the HMD device 104 in the virtual coordinate system and a location of the stereo visual content 216 at the modified display distance 616. Such determination may be performed, for example, using image data captured by HMD device 104 and spatial mapping techniques to establish the locations of the HMD device, couch 604 and other real-world and virtual objects within the field of view of the HMD device.

With reference also to FIG. 7, based on determining that couch 604 is located between the HMD device 104 and the stereoscopic 3D movie 216 at the modified display distance 616, the modified display distance may be shortened to a shortened modified display distance 704 that is between the occluding object 604 and the location of the HMD device 608. Using the shortened modified display distance 704 and as explained above, the size of the stereoscopic 3D movie 216 also may be scaled to account for the shortened modified display distance 704.

In some examples, other virtual content such as a three-dimensional holographic object may be displayed between the HMD device and stereo virtual content displayed at a modified display distance. In these examples, and as with real-world occluding objects discussed above, the modified display distance may be shortened to a shortened modified display distance that is between the occluding holographic content and the location of the HMD device.

In some examples, when the system determines that an occluding object is located between the location of the HMD device 104 in the virtual coordinate system and a location of visual content at a modified display distance, the HMD device may dim at least the occluding object. Any suitable method or device may be used to dim the occluding object. In one example, where the HMD device 104 is an augmented reality HMD device comprising an at least partially see-through display, the display may comprise an electro-chromatic material that may be selectively tinted to allow less light from a real-world occluding object through the display to reach the eyes of a viewer. In this manner, dimming may reduce the brightness of the occluding object and fade out the unwanted real-world content, such as the couch 604 in FIG. 6. As noted below, such dimming may be performed locally at the occluding object or, in some examples, globally across the entire display or field of view.

With reference again to FIG. 7, other real-world objects 172 in addition to an occluding object may be present within the field of view 224 of an HMD device 104. In this example, other real-world objects within the field of view include potted plant 628, bookshelf 632 and coat rack 636. In some examples, all of these other real-world objects 172 within the field of view 164 of the HMD device 104 may be dimmed. Additionally, in some examples other virtual content, such as the holographic cube 220 shown in FIG. 2, may be dimmed.

In some examples, a left eye image and a right eye image of stereo visual content may be modified independently to address one or more visual issues. Such modifications may include translation, rotation, and/or scaling. In some examples, displaying visual content 124 via an HMD device 104 may comprise determining a misalignment between a left eye image and right eye image. In some examples, misalignment may occur in stereo visual content 128, such as a 3D movie for example, due to poor capture of the original scene depicted in the content. For example, the misalignment may be due to a first camera capturing a left eye image at a position that is vertically and/or horizontally misaligned as compared with the position of a right eye image captured by a second camera. Based on determining such misalignment, the displayed position of at least one of the left eye image and the right eye image may be changed.

FIGS. 8A and 8B illustrate examples of changing the displayed position of at least one of a left eye image 808 and a right eye image 812 to correct for a vertical misalignment, indicated at 804. The HMD 104 may accomplish this using a variety of techniques, including eye tracking as described in more detail below. In this example the left eye image 808 is displayed by a left eye display 800L, and the right eye image 812 is displayed by a right eye display 800R. In other examples of HMD devices 104, a single display system may display both images. After identifying the misalignment 804, the displayed position of the left eye image 808 may be translated downwardly in the negative y-axis direction towards the bottom of the left eye display 800L, as illustrated by dashed line 816, until the y-axis positions of the two images are aligned. Additionally or alternatively, the displayed position of the right eye image 812 may be translated upwardly in the positive y-axis direction towards the top of the right eye display 800R, as illustrated by dashed line 820, to align the y-axis positions of the two images.

FIG. 8B illustrates an example of left eye display 800L and right eye display 800R after changing the displayed position of the left eye image 808 and the right eye image 812 to correct for the misalignment 804. In some examples, one or more of cropping and scaling also may be applied so that the left eye image 808 and the right eye image 812 may be equal sizes.

Figure 9:
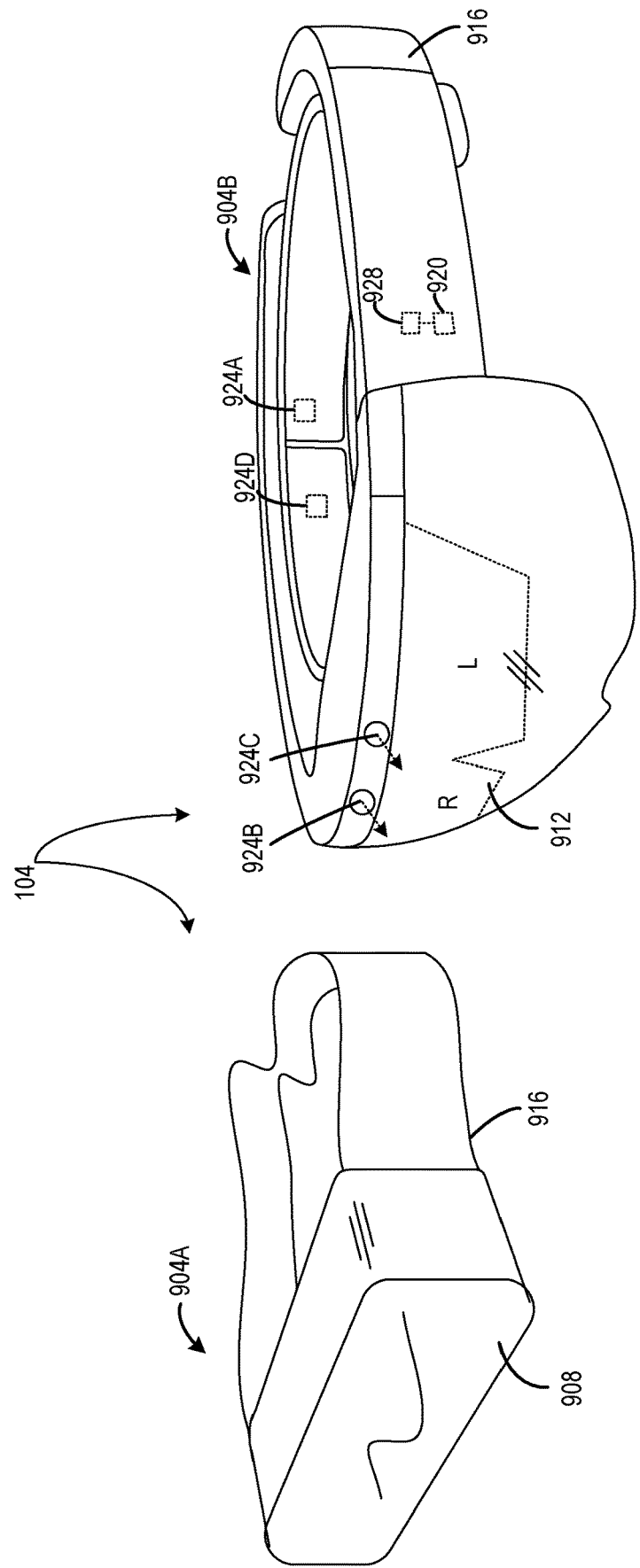
FIG. 9 shows two examples of head-mounted display devices according to examples of the present disclosure.

These and other aspects of the present disclosure may be practiced by HMD devices 104. FIG. 9 illustrates two examples of HMD devices 104. One example of an HMD device 104 is a virtual reality HMD device 904A that includes an opaque, non-see-through display 908. Another example of an HMD device 104 is an augmented reality HMD device 904B that comprises an at least partially transparent display 912. It will be appreciated that the following descriptions of sensors and systems may apply to both the augmented reality HMD device 904B and the virtual reality HMD device 904A.

In the example of FIG. 9, each of the example HMD devices 904A and 904B has a construction that includes a frame 916 that wraps around the head of the user to position a display close to the user's eyes. The frame of virtual reality HMD device 904A may include a rigid portion and an elastic portion whereas the frame 916 of augmented reality HMD device 904B may be substantially rigid around its circumference. The frame 916 may support additional components such as, for example, a processor 920 and input devices 924A, 924B, 924C and 924D. The processor 920 includes logic and associated computer memory 928 configured to provide visual content 124 to a display, to receive sensory signals from input devices 924A, 924B, 924C and 924D, and to enact various control processes described herein.

Various suitable display technologies and configurations may be used to display images via the displays of the HMD devices 904A and 904B. For example, in virtual reality HMD device 904A, the display 908 may be an opaque display, such as a non-see-through Light-Emitting Diode (LED) display, a Liquid Crystal Display (LCD), or any other suitable type of opaque or otherwise non-see-through display. In augmented reality HMD device 904B, the display 912 may be an at least partially transparent display that is configured to enable a wearer of the augmented reality HMD device 904B to view physical, real-world objects in the physical environment through one or more partially transparent pixels displaying virtual object representations. For example, the display 912 may include image-producing elements such as, for example, a see-through Organic Light-Emitting Diode (OLED) display.

As another example of a transparent display, the augmented reality HMD device 904B may include a light modulator on an edge of the display 912. In this example, the display 912 may serve as a light guide for delivering light from the light modulator to the eyes of a wearer. In other examples, the display 912 may utilize a liquid crystal on silicon (LCOS) display. The display 912 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 924A, 924B, 924C and 924D may include various sensors and related systems to provide information to the processor 920. Such sensors may include an inertial measurement unit (IMU) 924A, one or more image sensors 924B, and one or more ambient light sensors 924C. The one or more outward facing image sensors 924B may be configured to capture and/or measure physical environment attributes of the physical environment in which the augmented reality HMD device 904B is located. In one example, the one or more image sensors 924B may include a visible-light camera configured to collect a visible-light image of a physical space. Additionally, the input devices may include a presence sensor 924D that detects whether a user is wearing the HMD device. In one example, the presence sensor 924D may comprise an inwardly-facing image sensor configured to determine whether the user's head is adjacent to the sensor, which indicates the user is wearing the HMD device.

In one example of the augmented reality HMD device 904B that includes a display 912 having a transparent display type, the position and/or orientation of the augmented reality HMD device 904B relative to the physical environment may be assessed so that augmented-reality images may be accurately displayed in desired real-world locations with desired orientations. In both augmented reality HMD device 904B and virtual reality HMD device 904A, the IMU 924A may be configured to provide position and/or orientation data to the processor 920. The orientation derived from the sensor signals of the IMU may be used to display one or more holographic images with a realistic and stable position and orientation.

The processor 920 may include a logic processor and the two example HMD devices 104 may include volatile memory and non-volatile storage, as discussed in more detail below with respect to the example computing system 1100 of FIG. 11.

Figure 10A:
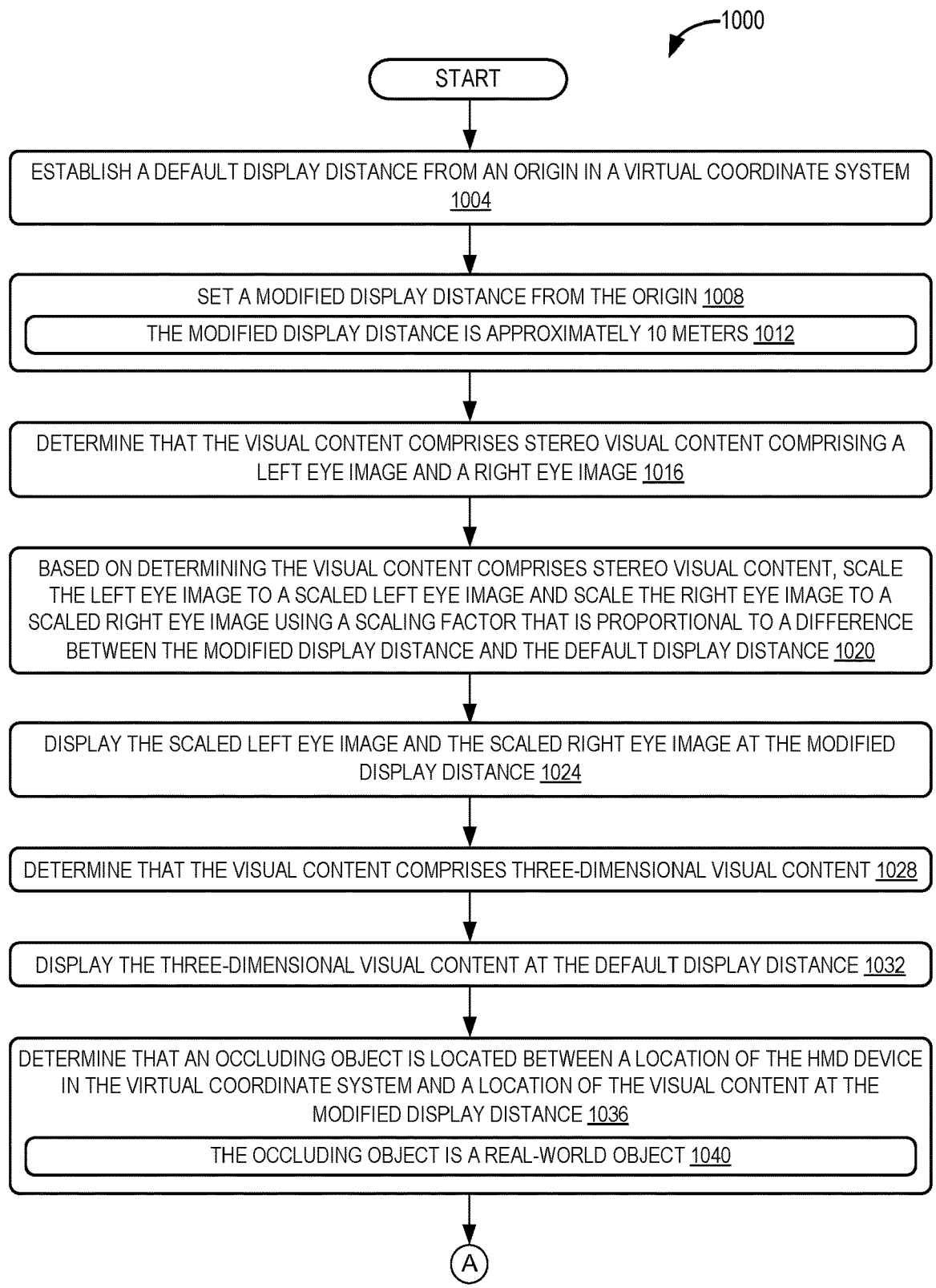
FIGS. 10A and 10B show a block diagram of a method for displaying visual content via a head-mounted display (HMD) device according to examples of the present disclosure.
Figure 10B:
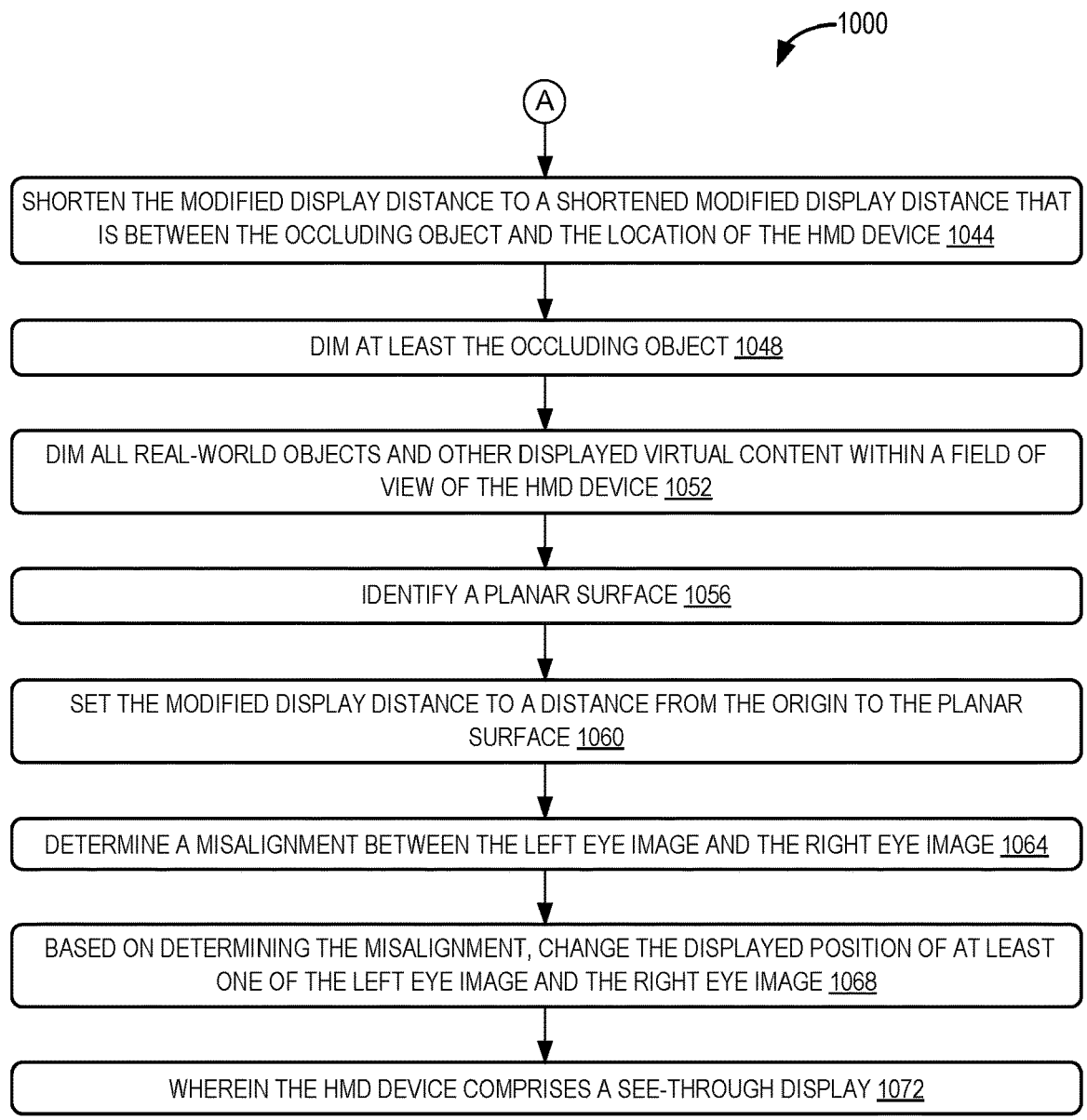

FIGS. 10A-10B illustrate a flow chart of a method 1000 for displaying visual content via a head-mounted display (HMD) device according to examples of the present disclosure. The following description of method 1000 is provided with reference to the software and hardware components described herein and shown in FIGS. 1-9 and 11. It will be appreciated that method 1000 also may be performed in other contexts using other suitable hardware and software components.

With reference to FIG. 10A, at 1004, the method 1000 may include establishing a default display distance from an origin in a virtual coordinate system. At 1008, the method 1000 may include setting a modified display distance from the origin. At 1012, the method 1000 may include wherein the modified display distance is approximately 10 meters.

At 1016, the method 1000 may include determining that the visual content comprises stereo visual content comprising a left eye image and a right eye image. At 1020, the method 1000 may include, based on determining that the visual content comprises stereo visual content, scaling the left eye image to a scaled left eye image and scaling the right eye image to a scaled right eye image using a scaling factor that is proportional to a difference between the modified display distance and the default display distance. At 1024, the method 1000 may include displaying the scaled left eye image and the scaled right eye image at the modified display distance.

At 1028, the method 1000 may include determining that the visual content comprises three-dimensional visual content. At 1032, the method 1000 may include displaying the three-dimensional visual content at the default display distance.

At 1036, the method 1000 may include determining that an occluding object is located between a location of the HMD device in the virtual coordinate system and a location of the visual content at the modified display distance. At 1040, the method 1000 may include wherein the occluding object is a real-world object.

With reference now to FIG. 10B, at 1044, the method 1000 may include shortening the modified display distance to a shortened modified display distance that is between the occluding object and the location of the HMD device. At 1048, the method 1000 may include dimming at least the occluding object. At 1052, the method 1000 may include dimming all real-world objects and other displayed virtual content within a field of view of the HMD device. At 1056, the method 1000 may include identifying a planar surface. At 1060, the method 1000 may include setting the modified display distance to a distance from the origin to the planar surface. At 1064, the method 1000 may include determining a misalignment between the left eye image and the right eye image. At 1068, the method 1000 may include based on determining the misalignment, changing a displayed position of at least one of the left eye image and the right eye image. At 1072, the method 1000 may include wherein an HMD device practicing the method comprises a see-through display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
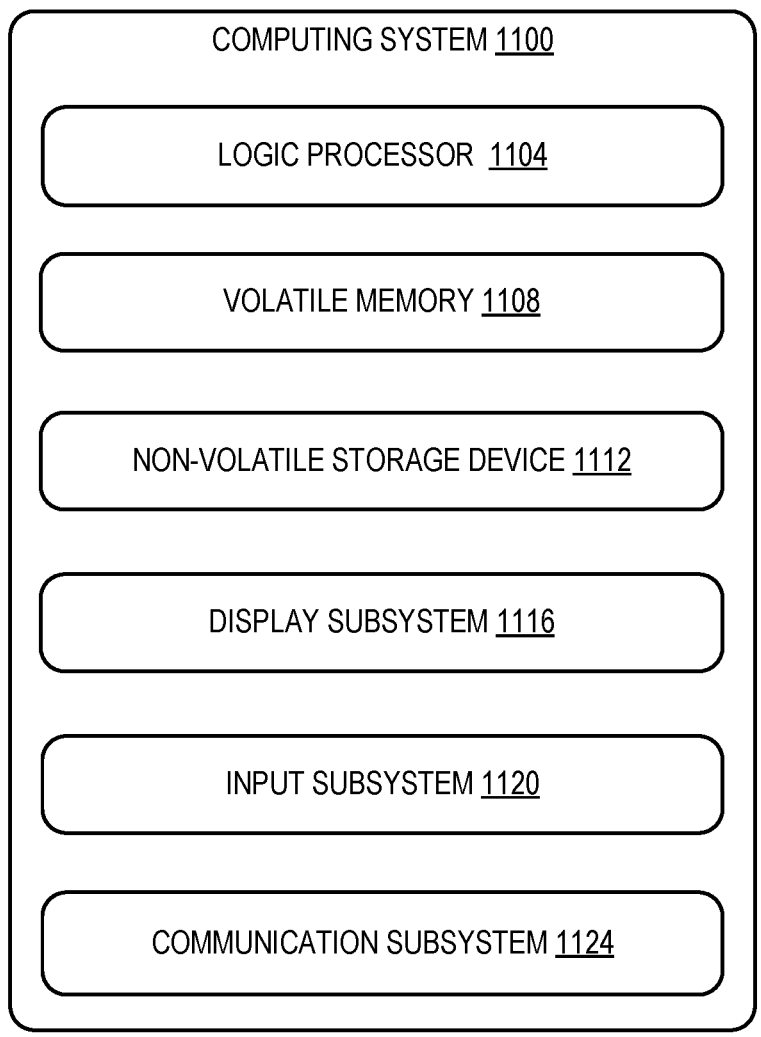
FIG. 11 shows a block diagram of an example computing device according to examples of the present disclosure.

FIG. 11 schematically shows a non-limiting embodiment of a computing system 1100 that can enact one or more of the methods and processes described above. Computing system 1100 is shown in simplified form. Computing system 1100 may take the form of one or more gaming consoles, personal computers, server computers, tablet computers, home-entertainment computers, network computing devices, gaming devices, mobile computing devices, mobile communication devices (e.g., smart phones), and/or other computing devices, and wearable computing devices such as smart wristwatches and head mounted display devices. In the above examples, computing device 108 may comprise computing system 1100 or one or more aspects of computing system 1100.

Computing system 1100 includes a logic processor 1104, volatile memory 1108, and a non-volatile storage device 1112. Computing system 1100 may optionally include a display subsystem 1116, input subsystem 1120, communication subsystem 1124, and/or other components not shown in FIG. 11.

Logic processor 1104 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1104 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1104 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1112 includes one or more physical devices configured to hold instructions executable by the logic processors to implement the methods and processes described herein. When such methods and processes are implemented, the state of non-volatile storage device 1112 may be transformed—e.g., to hold different data.

Non-volatile storage device 1112 may include physical devices that are removable and/or built-in. Non-volatile storage device 1112 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1112 may include nonvolatile, dynamic, static, read/write, read-only, sequential-access, location-addressable, file-addressable, and/or content-addressable devices. It will be appreciated that non-volatile storage device 1112 is configured to hold instructions even when power is cut to the non-volatile storage device 1112.

Volatile memory 1108 may include physical devices that include random access memory. Volatile memory 1108 is typically utilized by logic processor 1104 to temporarily store information during processing of software instructions. It will be appreciated that volatile memory 1108 typically does not continue to store instructions when power is cut to the volatile memory 1108.

Aspects of logic processor 1104, volatile memory 1108, and non-volatile storage device 1112 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1100 typically implemented in software by a processor to perform a particular function using portions of volatile memory, which function involves transformative processing that specially configures the processor to perform the function. Thus, a program or application may be instantiated via logic processor 1104 executing instructions held by non-volatile storage device 1112, using portions of volatile memory 1108. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1116 may be used to present a visual representation of data held by non-volatile storage device 1112. As the herein described methods and processes change the data held by the non-volatile storage device, and thus transform the state of the non-volatile storage device, the state of display subsystem 1116 may likewise be transformed to visually represent changes in the underlying data. Display subsystem 1116 may include one or more display devices utilizing virtually any type of technology. Such display devices may be combined with logic processor 1104, volatile memory 1108, and/or non-volatile storage device 1112 in a shared enclosure, or such display devices may be peripheral display devices.

When included, input subsystem 1120 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1124 may be configured to communicatively couple various computing devices described herein with each other, and with other devices. Communication subsystem 1124 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

The following paragraphs provide additional support for the claims of the subject application. One aspect provides, at a computing device, a method for displaying visual content via a head-mounted display (HMD) device, the method comprising: establishing a default display distance from an origin in a virtual coordinate system, setting a modified display distance from the origin, determining that the visual content comprises stereo visual content comprising a left eye image and a right eye image, based on determining that the visual content comprises stereo visual content, scaling the left eye image to a scaled left eye image and scaling the right eye image to a scaled right eye image using a scaling factor that is proportional to a difference between the modified display distance and the default display distance, and displaying the scaled left eye image and the scaled right eye image at the modified display distance.

The method may additionally or alternatively include determining that the visual content comprises three-dimensional visual content, and based on determining that the visual content comprises three-dimensional visual content, displaying the three-dimensional visual content at the default display distance. The method may additionally or alternatively include, wherein the modified display distance is approximately 10 meters.

The method may additionally or alternatively include determining that an occluding object is located between a location of the HMD device in the virtual coordinate system and a location of the visual content at the modified display distance, and shortening the modified display distance to a shortened modified display distance that is between the occluding object and the location of the HMD device. The method may additionally or alternatively include, wherein the occluding object is a real-world object.

The method may additionally or alternatively include determining that an occluding object is located between a location of the HMD device in the virtual coordinate system and a location of the visual content at the modified display distance, and based on determining that the occluding object is located between the location of the HMD device and the location of the visual content, dimming at least the occluding object. The method may additionally or alternatively include dimming all real-world objects and other displayed virtual content within a field of view of the HMD device.

The method may additionally or alternatively include identifying a planar surface, and based on identifying the planar surface, setting the modified display distance to a distance from the origin to the planar surface. The method may additionally or alternatively include determining a misalignment between the left eye image and the right eye image, and based on determining the misalignment, changing a displayed position of at least one of the left eye image and the right eye image.

Another aspect provides a computing device communicatively coupled to a head-mounted display (HMD) device, the computing device comprising: a processor, and a memory holding instructions executable by the processor to establish a default display distance from an origin in a virtual coordinate system, set a modified display distance from the origin, determine that visual content comprises stereo visual content comprising a left eye image and a right eye image, based on determining that the visual content comprises stereo visual content, scale the left eye image to a scaled left eye image and the right eye image to a scaled right eye image using a scaling factor that is proportional to a difference between the modified display distance and the default display distance, and cause the HMD device to display the scaled left eye image and the scaled right eye image at the modified display distance.

The computing device may additionally or alternatively include, wherein the HMD device comprises a see-through display. The computing device may additionally or alternatively include, wherein the instructions are executable by the processor to: determine that the visual content comprises three-dimensional visual content, and based on determining that the visual content comprises three-dimensional visual content, display the three-dimensional visual content at the default display distance. The computing device may additionally or alternatively include, wherein the modified display distance is approximately 10 meters.

The computing device may additionally or alternatively include, wherein the instructions are executable by the processor to: determine that an occluding object is located between a location of the HMD device in the virtual coordinate system and a location of the visual content at the modified display distance, and shorten the modified display distance to a shortened modified display distance that is between the occluding object and the location of the HMD device. The computing device may additionally or alternatively include, wherein the occluding object is a real-world object.

The computing device may additionally or alternatively include, wherein the instructions are executable by the processor to: determine that an occluding object is located between a location of the HMD device in the virtual coordinate system and a location of the visual content at the modified display distance, and based on determining that the occluding object is located between the location of the HMD device and the location of the visual content, dim at least the occluding object. The computing device may additionally or alternatively include, wherein the instructions are executable by the processor to dim all real-world objects and other displayed virtual content within a field of view of the HMD device.

The computing device may additionally or alternatively include, wherein the instructions are executable by the processor to: identify a planar surface, and based on identifying the planar surface, set the modified display distance to a distance from the origin to the planar surface. The computing device may additionally or alternatively include, wherein the instructions are executable by the processor to: determine a misalignment between the left eye image and the right eye image, and based on determining the misalignment, change a displayed position of at least one of the left eye image and the right eye image.

Another aspect provides a head-mounted display (HMD) device for displaying visual content, comprising: a display, a processor, and a memory holding instructions executable by the processor to establish a default display distance from an origin in a virtual coordinate system, set a modified display distance from the origin, determine that visual content comprises stereo visual content comprising a left eye image and a right eye image, based on determining that the visual content comprises stereo visual content, scale the left eye image to a scaled left eye image and the right eye image to a scaled right eye image using a scaling factor that is proportional to a difference between the modified display distance and the default display distance, and display the scaled left eye image and the scaled right eye image at the modified display distance.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for displaying visual content via a head-mounted display (HMD) device, the method comprising:
   establishing a default display distance from an origin in a virtual coordinate system;
   setting a modified display distance from the origin;
   determining that the visual content comprises stereo visual content comprising a left eye image and a right eye image;
   based on determining that the visual content comprises stereo visual content, scaling the left eye image to a scaled left eye image and scaling the right eye image to a scaled right eye image using a scaling factor that is proportional to a difference between the modified display distance and the default display distance; and
   displaying the scaled left eye image and the scaled right eye image at the modified display distance.

2. The method of claim 1, further comprising:
   determining that the visual content comprises three-dimensional visual content; and
   based on determining that the visual content comprises three-dimensional visual content, displaying the three-dimensional visual content at the default display distance.

3. The method of claim 1, wherein the modified display distance is approximately 10 meters.

4. The method of claim 1, further comprising:
   determining that an occluding object is located between a location of the HMD device in the virtual coordinate system and a location of the visual content at the modified display distance; and
   shortening the modified display distance to a shortened modified display distance that is between the occluding object and the location of the HMD device.

5. The method of claim 4, wherein the occluding object is a real-world object.

6. The method of claim 1, further comprising:
   determining that an occluding object is located between a location of the HMD device in the virtual coordinate system and a location of the visual content at the modified display distance; and
   based on determining that the occluding object is located between the location of the HMD device and the location of the visual content, dimming at least the occluding object.

7. The method of claim 6, further comprising dimming all real-world objects and other displayed virtual content within a field of view of the HMD device.

8. The method of claim 1, further comprising:
   identifying a planar surface; and
   based on identifying the planar surface, setting the modified display distance to a distance from the origin to the planar surface.

9. The method of claim 1, further comprising:
   determining a misalignment between the left eye image and the right eye image; and
   based on determining the misalignment, changing a displayed position of at least one of the left eye image and the right eye image.

10. A computing device communicatively coupled to a head-mounted display (HMD) device, the computing device comprising:
    a processor; and
    a memory holding instructions executable by the processor to:
       establish a default display distance from an origin in a virtual coordinate system;
       set a modified display distance from the origin;
       determine that visual content comprises stereo visual content comprising a left eye image and a right eye image;
       based on determining that the visual content comprises stereo visual content, scale the left eye image to a scaled left eye image and the right eye image to a scaled right eye image using a scaling factor that is proportional to a difference between the modified display distance and the default display distance; and
       cause the HMD device to display the scaled left eye image and the scaled right eye image at the modified display distance.

11. The computing device of claim 10, wherein the HMD device comprises a see-through display.

12. The computing device of claim 10, wherein the instructions are executable by the processor to:
    determine that the visual content comprises three-dimensional visual content; and
    based on determining that the visual content comprises three-dimensional visual content, display the three-dimensional visual content at the default display distance.

13. The computing device of claim 10, wherein the modified display distance is approximately 10 meters.

14. The computing device of claim 10, wherein the instructions are executable by the processor to:
    determine that an occluding object is located between a location of the HMD device in the virtual coordinate system and a location of the visual content at the modified display distance; and
    shorten the modified display distance to a shortened modified display distance that is between the occluding object and the location of the HMD device.

15. The computing device of claim 14, wherein the occluding object is a real-world object.

16. The computing device of claim 10, wherein the instructions are executable by the processor to:
    determine that an occluding object is located between a location of the HMD device in the virtual coordinate system and a location of the visual content at the modified display distance; and
    based on determining that the occluding object is located between the location of the HMD device and the location of the visual content, dim at least the occluding object.

17. The computing device of claim 16, wherein the instructions are executable by the processor to dim all real-world objects and other displayed virtual content within a field of view of the HMD device.

18. The computing device of claim 10, wherein the instructions are executable by the processor to:
- identify a planar surface; and
- based on identifying the planar surface, set the modified display distance to a distance from the origin to the planar surface.

19. The computing device of claim 10, wherein the instructions are executable by the processor to:
- determine a misalignment between the left eye image and the right eye image; and
- based on determining the misalignment, change a displayed position of at least one of the left eye image and the right eye image.

20. A head-mounted display (HMD) device for displaying visual content, comprising:
- a display;
- a processor; and
- a memory holding instructions executable by the processor to:
  - establish a default display distance from an origin in a virtual coordinate system;
  - set a modified display distance from the origin;
  - determine that visual content comprises stereo visual content comprising a left eye image and a right eye image;
  - based on determining that the visual content comprises stereo visual content, scale the left eye image to a scaled left eye image and the right eye image to a scaled right eye image using a scaling factor that is proportional to a difference between the modified display distance and the default display distance; and
  - display the scaled left eye image and the scaled right eye image at the modified display distance.

* * * * *